United States Patent
Takano

(10) Patent No.: US 10,194,333 B2
(45) Date of Patent: Jan. 29, 2019

(54) TERMINAL APPARATUS, BASE STATION, AND PROGRAM

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 121 days.

(21) Appl. No.: 15/307,916

(22) PCT Filed: Feb. 24, 2015

(86) PCT No.: PCT/JP2015/055286
§ 371 (c)(1),
(2) Date: Oct. 31, 2016

(87) PCT Pub. No.: WO2015/186380
PCT Pub. Date: Dec. 10, 2015

(65) Prior Publication Data
US 2017/0055162 A1 Feb. 23, 2017

(30) Foreign Application Priority Data

Jun. 6, 2014 (JP) .................................. 2014-117541

(51) Int. Cl.
*H04W 16/28* (2009.01)
*H04W 36/30* (2009.01)
*H04W 24/08* (2009.01)
*H04B 7/06* (2006.01)
*H04L 5/00* (2006.01)

(52) U.S. Cl.
CPC .......... *H04W 16/28* (2013.01); *H04B 7/0617* (2013.01); *H04L 5/005* (2013.01); *H04L 5/0073* (2013.01); *H04W 24/08* (2013.01); *H04W 36/30* (2013.01); *H04L 5/0023* (2013.01); *H04L 5/0048* (2013.01); *H04L 5/0053* (2013.01)

(58) Field of Classification Search
CPC .............................. H04B 7/0617; H04W 16/28
See application file for complete search history.

(56) References Cited

U.S. PATENT DOCUMENTS

2013/0301454 A1* 11/2013 Seol ........................ H04B 7/043
370/252

FOREIGN PATENT DOCUMENTS

| JP | 2011-004056 A | 1/2011 |
| JP | 2013-236168 A | 11/2013 |
| JP | 2014-027608 A | 2/2014 |
| WO | 2014/038321 A1 | 3/2014 |

OTHER PUBLICATIONS

International Search Report dated Jun. 2, 2015 in PCT/JP2015/055286 filed Feb. 24, 2015.

* cited by examiner

*Primary Examiner* — Shukri Taha
(74) *Attorney, Agent, or Firm* — XSensus LLP

(57) ABSTRACT

[Object] To provide a mechanism which allows for selection of a suitable cell for a terminal apparatus when beamforming is performed. [Solution] A terminal apparatus includes: a wireless communication unit configured to perform wireless communication with a base station; and a control unit configured to perform measurement when the wireless communication unit receives a transmitted measurement reference signal to which the base station has applied a plurality of transmission weights for beamforming.

19 Claims, 25 Drawing Sheets

FIG. 11
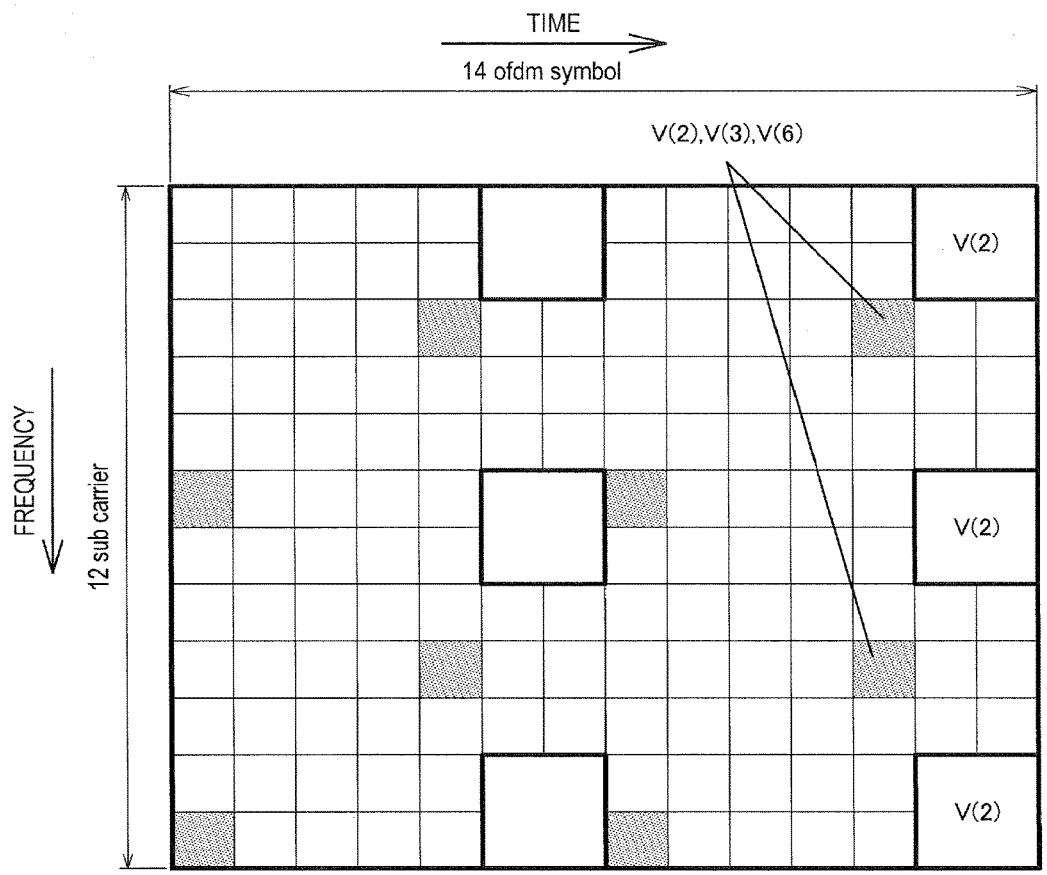
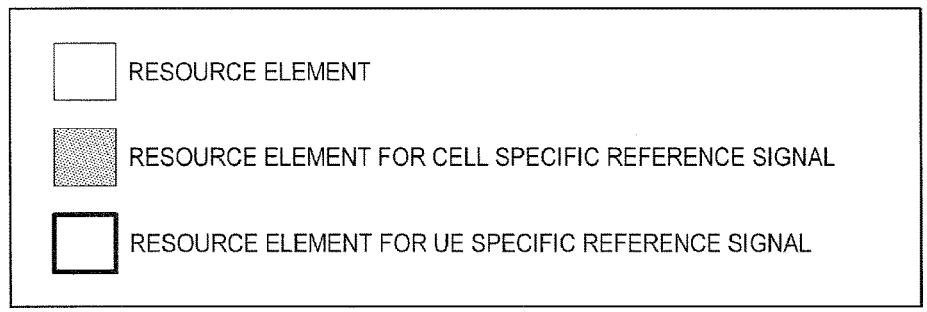

FIG. 13
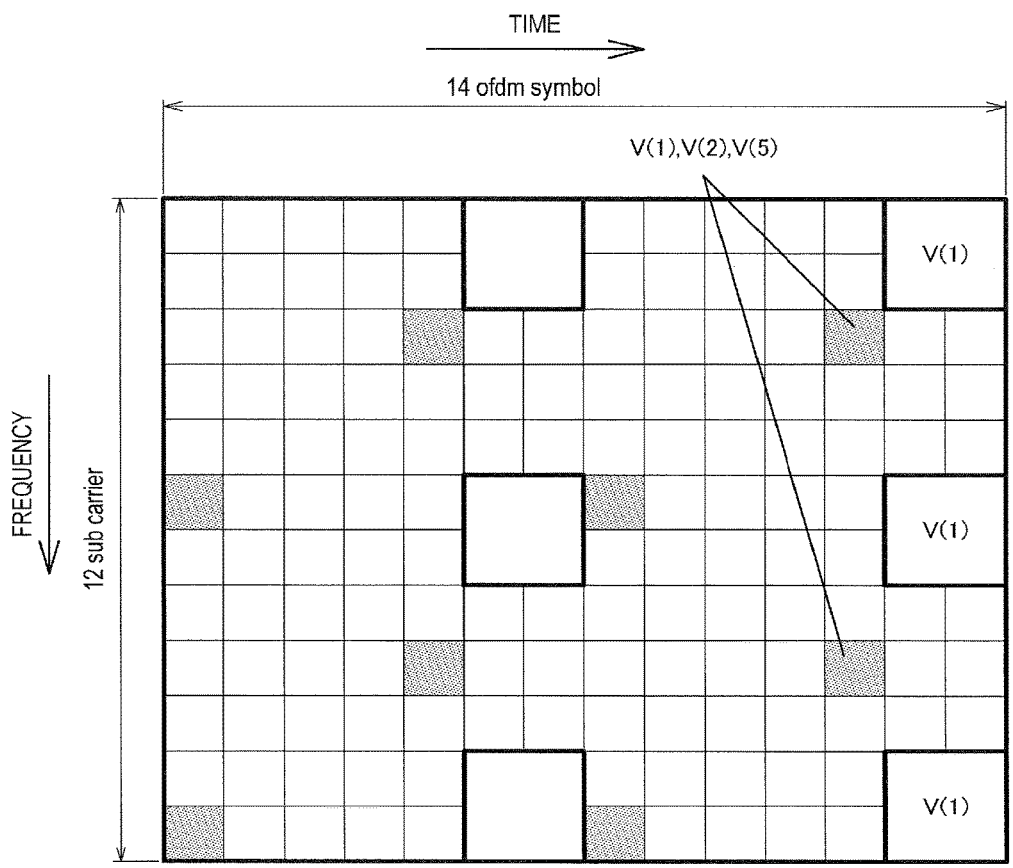
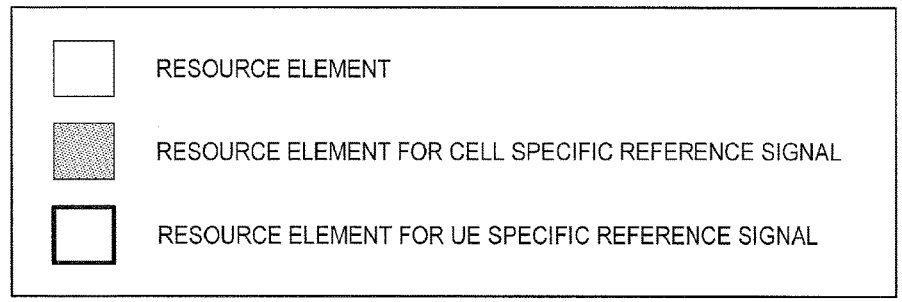

FIG. 17
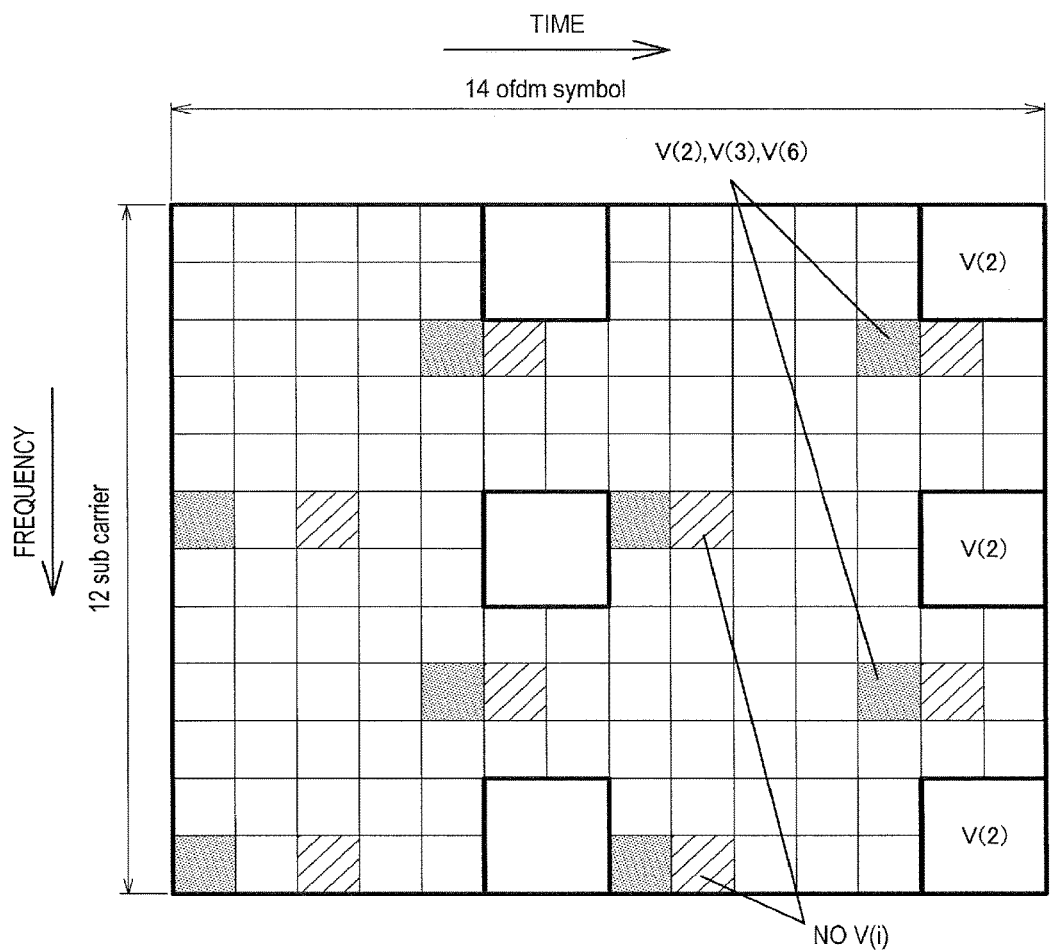
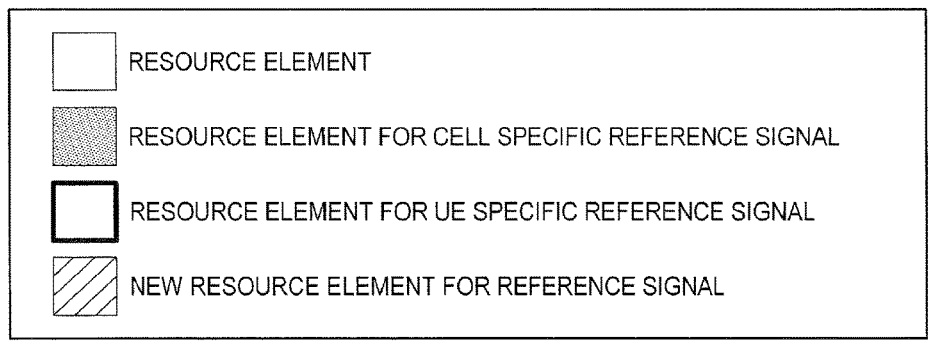

FIG. 19
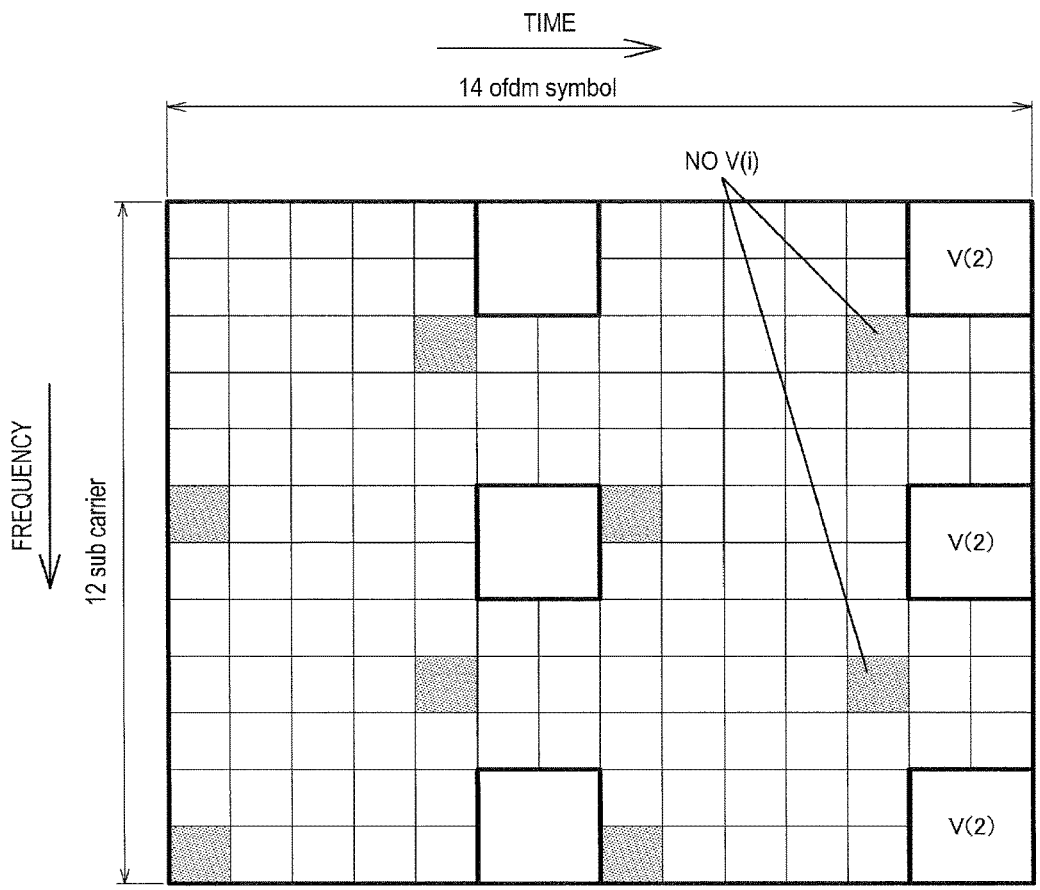
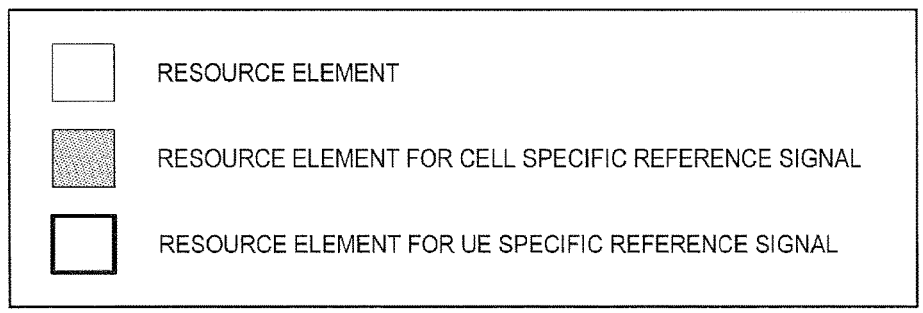

FIG. 20
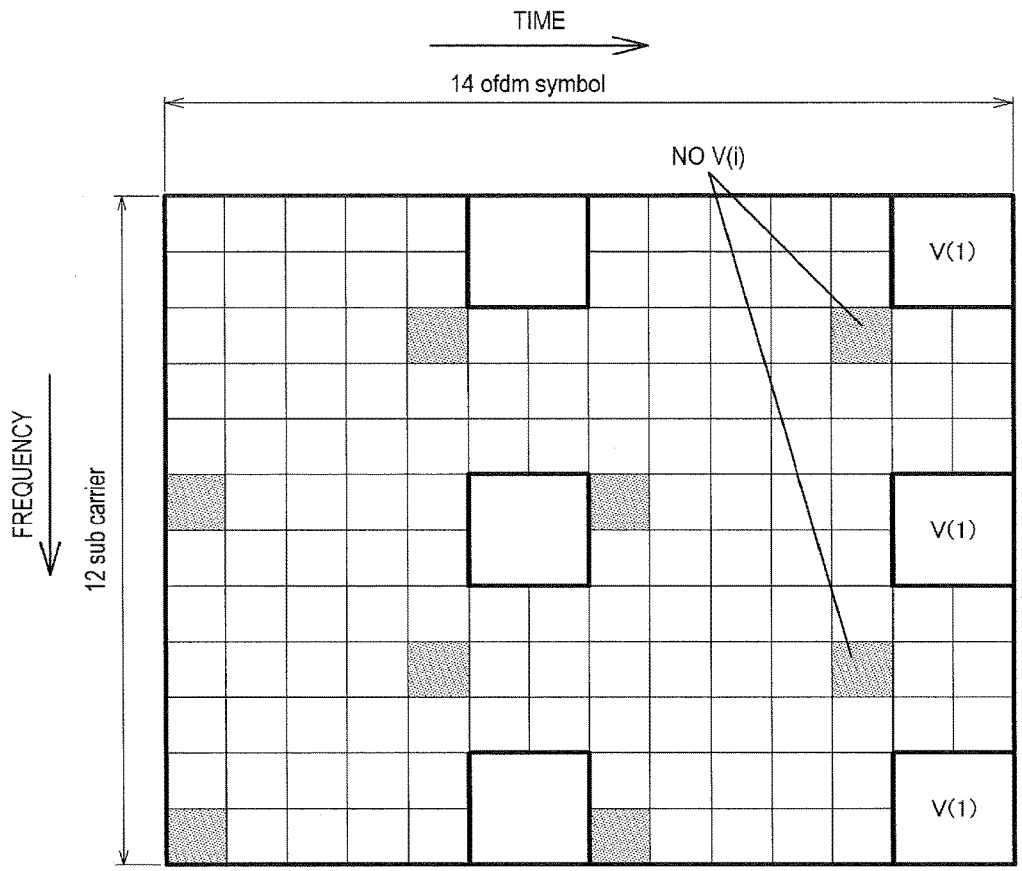
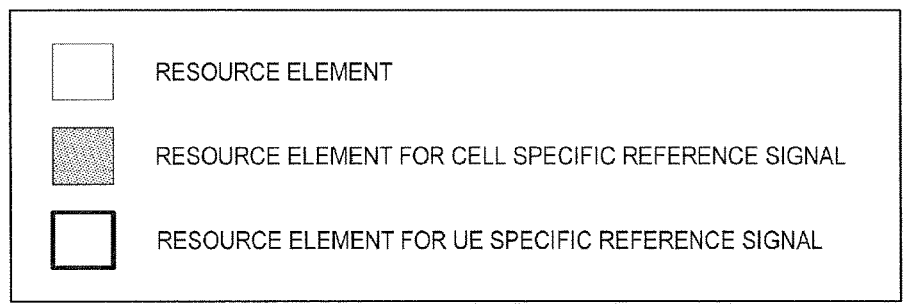

TERMINAL APPARATUS, BASE STATION, AND PROGRAM

TECHNICAL FIELD

The present disclosure relates to terminal apparatuses, base stations, and programs.

BACKGROUND ART

In the Third Generation Partnership Project (3GPP), various techniques for improving the capacity of a cellular system are currently studied in order to accommodate explosively increasing traffic. It is also envisaged that the required capacity will become about 1000 times the current capacity in the future. Techniques such as multi-user multi-input multiple-input multiple-output (MU-MIMO), coordinated multipoint (CoMP), and the like could increase the capacity of a cellular system by a factor of as low as less than ten. Therefore, there is a demand for an innovative technique.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO or massive MIMO. By such beamforming, the half-width of a beam is narrowed. In other words, a sharp beam is formed. Also, if the large number of antenna elements are arranged in a plane, a beam aimed in a desired three-dimensional direction can be formed.

Note that various techniques for beamforming have been proposed. For example, Patent Literature 1 discloses a technique of allowing a base station to perform beamforming even when an uplink channel and a downlink channel have different frequency bands.

CITATION LIST

Patent Literature

Patent Literature 1: JP 2011-004056A

SUMMARY OF INVENTION

Technical Problem

However, when beamforming is performed, a suitable cell for a terminal apparatus may fail to be selected.

Specifically, typically, selection of a cell for a terminal apparatus (e.g., cell selection/cell reselection by a terminal apparatus and handover decision by a base station, etc.) is performed on the basis of the result of measurements of a cell-specific reference signal (CRS), which is transmitted without beamforming. Therefore, the resultant selected cell is a cell suitable for reception of a signal transmitted without beamforming, and is not always a cell suitable for reception of a signal transmitted with beamforming. Therefore, when beamforming is performed, a suitable cell for a terminal apparatus may fail to be selected. This may be significant particularly when the above beamforming is performed using a directional antenna including a large number of antenna elements.

Therefore, it is desirable to provide a mechanism which allows for selection of a suitable cell for a terminal apparatus when beamforming is performed.

Solution to Problem

According to the present disclosure, there is provided a terminal apparatus including: a wireless communication unit configured to perform wireless communication with a base station; and a control unit configured to perform measurement when the wireless communication unit receives a transmitted measurement reference signal to which the base station has applied a plurality of transmission weights for beamforming.

According to the present disclosure, there is provided a base station including: a wireless communication unit configured to perform wireless communication with a terminal apparatus; and a control unit configured to control the wireless communication unit in a manner that the wireless communication unit transmits information indicating a plurality of transmission weights for beamforming and a measurement reference signal before application of the plurality of transmission weights for beamforming, to the terminal apparatus.

According to the present disclosure, there is provided a base station including: a wireless communication unit configured to perform wireless communication with a terminal apparatus; and a control unit configured to control the wireless communication unit in a manner that the wireless communication unit transmits a measurement reference signal after application of a plurality of transmission weights for beamforming.

According to the present disclosure, there is provided a program for causing a computer to function as: a wireless communication unit configured to perform wireless communication with a terminal apparatus; and a control unit configured to control the wireless communication unit in a manner that the wireless communication unit transmits information indicating a plurality of transmission weights for beamforming and a measurement reference signal before application of the plurality of transmission weights for beamforming, to the terminal apparatus.

According to the present disclosure, there is provided a program for causing a computer to function as: a wireless communication unit configured to perform wireless communication with a terminal apparatus; and a control unit configured to control the wireless communication unit in a manner that the wireless communication unit transmits a measurement reference signal after application of a plurality of transmission weights for beamforming.

Advantageous Effects of Invention

As described above, according to the present disclosure, a suitable cell for a terminal apparatus can be selected when beamforming is performed.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 11 is a diagram for describing a first example of a correspondence relationship between a wireless resource and a weight set.

FIG. 13 is a diagram for describing a second example of a correspondence relationship between a wireless resource and a weight set.

FIG. 17 is a diagram for describing an example of mapping of a measurement reference signal according to a second embodiment.

FIG. 19 is a diagram for describing an example of mapping of a measurement reference signal according to a third embodiment.

FIG. 20 is a diagram for describing an example of mapping of a measurement reference signal according to a third embodiment.

DESCRIPTION OF EMBODIMENT(S)

Figure 1:
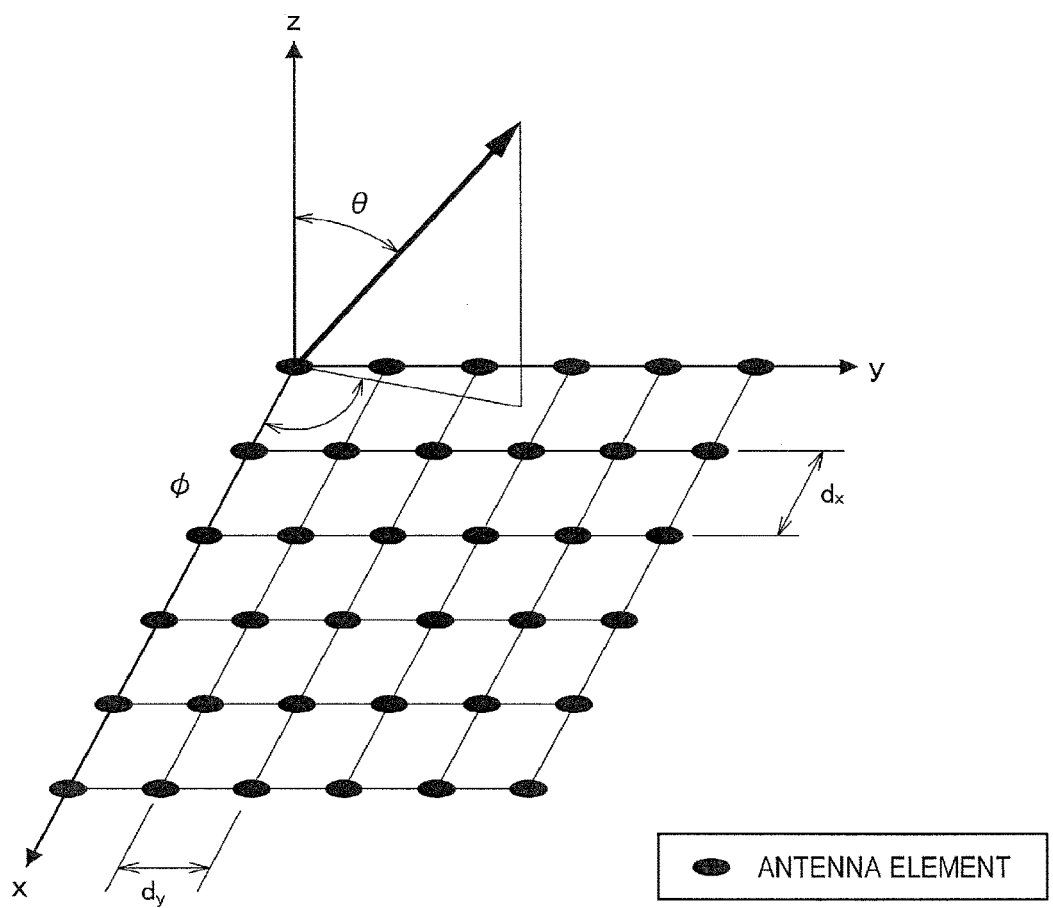
FIG. 1 is a diagram for describing a weight set for large-scale MIMO beamforming.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In this specification and the drawings, there are cases in which components having substantially the same functional configuration are distinguished by adding different alphabets to the end of the same reference numeral. For example, a plurality of components having substantially the same functional configuration are distinguished like a terminal apparatus 200A, a terminal apparatus 200B, and a terminal apparatus 200C as necessary. However, when a plurality of components having substantially the same functional configuration need not be particularly distinguished, only the same reference numeral is added. For example, when the terminal apparatus 200A, the terminal apparatus 200B, and the terminal apparatus 200C need not be particularly distinguished, they are referred to simply as a "terminal apparatus 200."

Note that description will be provided in the following order.

1. Introduction
2. Schematic configuration of communication system
3. First embodiment
3-1. Configuration example of base station
3-2. Configuration example of terminal apparatus
3-3. Operation process
4. Second embodiment
4-1. Overview
4-2. Configuration example of base station
4-3. Configuration example of terminal apparatus
4-4. Operation process
4-5. Variations
5. Third embodiment
5-1. Configuration example of base station
5-2. Configuration example of terminal apparatus
5-3. Operation process
6. Application examples
6-1. Application examples for base station
6-2. Application examples for terminal apparatus
7. Conclusion

1. INTRODUCTION

Firstly, beamforming, measurements, cell selection, and the necessity of semi-static beamforming will be described with reference to FIG. 1 to FIG. 3.

(Beamforming)

(a) Necessity of Large-Scale MIMO

In the 3GPP, various techniques for improving the capacity of a cellular system are currently studied in order to accommodate explosively increasing traffic. It is envisaged that the required capacity will become about 1000 times the current capacity in the future. Techniques such as MU-MIMO, CoMP, and the like could increase the capacity of a cellular system by a factor of as low as less than ten. Therefore, there is a demand for an innovative technique.

Release 10 of the 3GPP specifies that eNodeB is equipped with eight antennas. Therefore, the antennas can provide eight-layer MIMO in the case of single-user multi-input multiple-input multiple-output (SU-MIMO). Eight-layer MIMO is a technique of spatially multiplexing eight separate streams. Alternatively, the antennas can provide four-user two-layer MU-MIMO.

User equipment (UE) has only a small space for accommodating an antenna, and limited processing capability, and therefore, it is difficult to increase the number of antenna elements in the antenna of UE. However, recent advances in antenna mounting technology have allowed eNodeB to accommodate a directional antenna including about 100 antenna elements.

For example, as a technique for significantly increasing the capacity of a cellular system, a base station may perform beamforming using a directional antenna including a large number of antenna elements (e.g., about 100 antenna elements). Such a technique is a kind of technique called large-scale MIMO, massive MIMO, or 3D MIMO. By such beamforming, the half-width of a beam is narrowed. In other words, a sharp beam is formed. Also, if the large number of antenna elements are arranged in a plane, a beam aimed in a desired three-dimensional direction can be formed. For example, it has been proposed that, by forming a beam aimed at a higher position than that of a base station (e.g., a higher floor of a high-rise building), a signal is transmitted to a terminal apparatus located at that position.

In typical beamforming, the direction of a beam can be changed in the horizontal direction. Therefore, it can be said that the typical beamforming is two-dimensional beamforming. Meanwhile, in large-scale MIMO (or massive MIMO) beamforming, the direction of a beam can be changed in the vertical direction as well as the horizontal direction. Therefore, it can be said that large-scale MIMO beamforming is three-dimensional beamforming.

Note that the increase in the number of antennas allows for an increase in the number of MU-MIMO users. Such a technique is another form of the technique called large-scale MIMO or massive MIMO. Note that when the number of antennas in UE is two, the number of spatially separated streams is two for a single piece of LIE, and therefore, it is more reasonable to increase the number of MU-MIMO users than to increase the number of streams for a single piece of UE.

(b) Weight Set

Transmission weights for beamforming are represented by a complex number as a weight set (i.e., a set of weight coefficients for a plurality a antenna elements). An example of a weight set particularly for large-scale MIMO beamforming will now be described with reference to FIG. 1.

FIG. 1 is a diagram for describing a weight set for large-scale MIMO beamforming. FIG. 1 shows antenna elements arranged in a grid pattern. FIG. 1 also shows two orthogonal axes x and y in a plane in which the antenna elements are arranged, and an axis z perpendicular to the plane. Here, the direction of a beam to be formed is, for example, represented by an angle phi (Greek letter) and an angle theta (Greek letter). The angle phi (Greek letter) is an angle between an xy-plane component of the direction of a beam and the x-axis. Also, the angle theta (Greek letter) is an angle between the beam direction and the z-axis in this case, for example, the weight coefficient $V_{m,n}$ of an antenna element which is m-th in the x-axis direction and n-th in the y-axis direction is represented as follows,

[Math. 1]

$$V_{m,n}(\theta, \varphi, f) = \exp\left(j2\pi \frac{f}{c}\{(m-1)d_x \sin(\theta)\cos(\varphi) + (n-1)d_y \sin(\theta)\sin(\varphi)\}\right)$$

Formula (1)

In formula (1), f is a frequency, and c is the speed of light. Also, j is the imaginary unit of a complex number. Also, $d_x$ is an interval between each antenna element in the x-axis direction, and $d_y$ is an interval between each antenna element in the y-axis direction. Note that the coordinates of an antenna element are represented as follows

[Math. 2]

$$x=(m-1)d_x, \quad y=(n-1)d_y$$

Formula (2)

Note that a typical weight set for beamforming (two-dimensional beamforming) may be divided into a weight set for forming a beam aimed in a desired horizontal direction, and a weight set for adjusting transfer between antennas. Therefore, a weight set for large-scale MIMO beamforming may be divided into a first weight set for forming a beam aimed in a desired vertical direction, a second weight set for forming a beam aimed in a desired horizontal direction, and a third weight set for adjusting transfer between antennas.

(c) Change in Environment Due to Large-Scale MIMO Beamforming

When large-scale MIMO beamforming is performed, the gain reaches 10 dB or more. In a cellular system employing the above beamforming, a significant change in radio wave environment may occur compared to a cellular system which does not employ beamforming.

(d) Case where Large-Scale MIMO Beamforming is Performed

For example, a base station in urban areas may form a beam aimed at a high-rise building. Also, even in rural areas, a base station of a small cell may form a beam aimed at an area around the base station. Note that it is highly likely that a base station of a macro-cell in rural areas does not perform large-scale MIMO beam forming.

(Measurements)

(a) Measurements of CRS

In Long Term Evolution (LTE), a terminal apparatus measures a cell-specific reference signal (CRS) transmitted from a base station. Specifically, a terminal apparatus receives a CRS transmitted from a base station, and measures the quality of a transmission path between the base station and the terminal apparatus. The measurements are called "radio resource management (RRM) measurements" or simply "measurements."

The result of the measurements is used in order to select a cell for a terminal apparatus. Specifically, for example, the result of the measurements is used in cell selection/cell reselection performed by a terminal apparatus which is a radio resource control (RRC) idle. Also, for example, the result of the measurements is reported by an RRC-connected terminal apparatus to a base station, and is used by the base station in handover decision.

As described above, the above measurements are performed by reception of a CRS. A CRS is a signal for measuring the quality of the transmission path of non-directional radio waves, and therefore, is transmitted without beamforming. In other words, a CRS is transmitted without being multiplied by a weight set for beamforming.

Note that there is a reference signal for demodulation called a demodulation reference signal (DM-RS) or a UE specific reference signal. The reference signal for demodulation is multiplied by a weight set for beamforming, and therefore, is not desirable for measurements of the quality of the transmission path of non-directional radio waves. Also, there is a reference signal called a channel state information reference signal (CSI-RS). A CSI-RS is transmitted without beamforming as with a CRS. However, the transmission frequency of a CSI-RS is low, and therefore, it takes a long time to perform measurements by reception of a CSI-RS. A relationship between multiplication of weight coefficients and insertion (or mapping) of a reference signal will be described with reference to FIG. 2.

Figure 2:
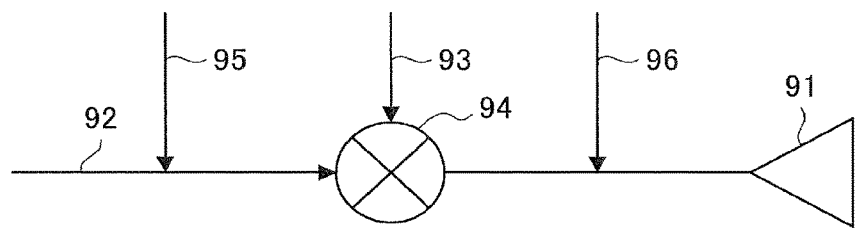
FIG. 2 is a diagram for describing a relationship between multiplication of weight coefficients and insertion of a reference signal.
Figure 3:
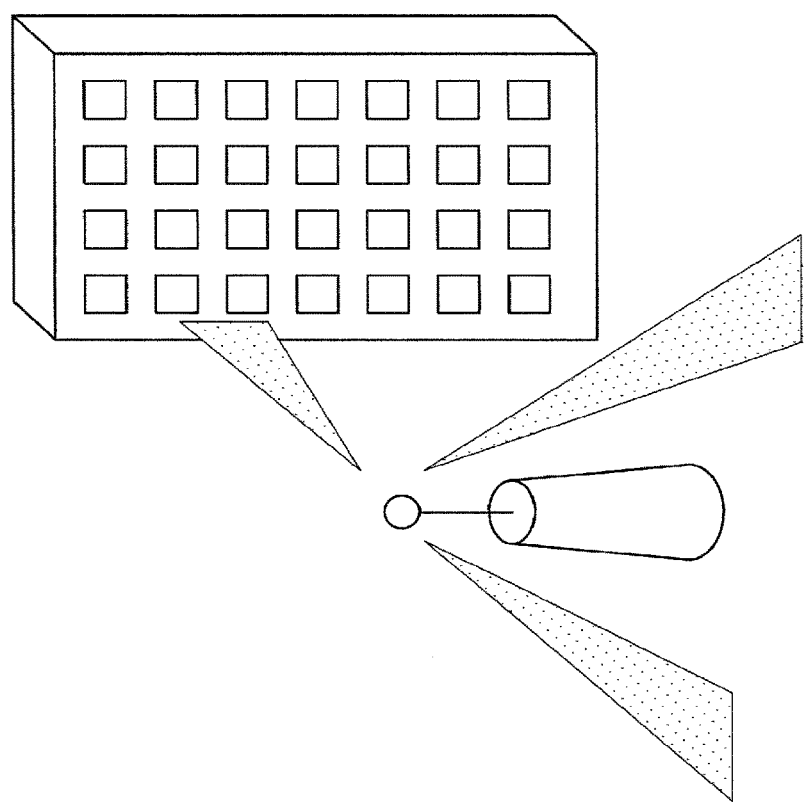
FIG. 3 is a diagram for describing a provision example of large-scale MIMO beamforming.

FIG. 2 is a diagram for describing the relationship between multiplication of weight coefficients and insertion (or mapping) of a reference signal. Referring to FIG. 2, a transmission signal 92 corresponding to each antenna element 91 is complex-multiplied by a weight coefficient 93 by a multiplier 94. Thereafter, the transmission signal 92 complex-multiplied by the weight coefficient 93 is transmitted from the antenna element 91. Also, a DR-MS 95 is inserted before the multiplier 94, and is complex-multiplied by the weight coefficient 93 by the multiplier 94. Thereafter, the DR-MS 95 complex-multiplied by the weight coefficient 93 is transmitted from the antenna element 91. Meanwhile, a CRS 96 (and a CSI-RS) is inserted after the multiplier 94. Thereafter, the CRS 96 (and the CSI-RS) is transmitted from the antenna element 91 without being multiplied by the weight coefficient 93.

(b) RSRP and RSRQ

In LTE, measurements of a CRS are measurements of reference signal received power (RSRP) and/or reference signal received quality (RSRQ). In other words, a terminal apparatus acquires RSRP and/or RSRQ as a result of measurements of a CRS. RSRQ is calculated from RSRP and received signal strength indicator (RSSI).

RSRP is CRS received power per each single resource element. In other words, RSRP is the average value of CRS received power. CRS received power is obtained by detection of a correlation between a received signal in a CRS resource element and a CRS, which is a known signal. RSRP corresponds to a desired signal "S (signal)."

RSSI is the total power of a signal per orthogonal frequency division multiple access (OFDMA) symbol. Therefore, RSSI includes a desired signal, an interference signal, and noise. Specifically, RSSI corresponds to "S (signal)+I (interference)+N (noise)."

RSRQ is RSRP/(RSSI/N), where N is the number of resource blocks used in calculation of RSSI. The resource blocks are resource blocks arranged in the frequency direction. Therefore, RSRQ is a value obtained by dividing RSRP by RSSI per resource block. In other words, RSRQ corresponds to a signal-to-interference-plus-noise ratio (SINR).

As described above, received power (i.e., RSRP), and the quality of reception (i.e., RSRQ) such as SINR, are obtained by measurements of a CRS.

(c) Effect of Averaging

In order to acquire RSRP and RSRQ, it is necessary to receive a signal for several milliseconds to several tens of milliseconds, and calculate the average of the received power. This is because when RSRP and RPRQ are averaged over only one slot or one subset, the averages are likely to be affected by an instantaneous change of a channel such as fading or the like.

Note that the above averaging technique is provided to each terminal apparatus, and is not specified in the standard.

(Cell Selection)

(a) Cell Selection Example

For example, when a terminal apparatus is RRC idle, the terminal apparatus performs cell selection/cell reselection. Specifically, the terminal apparatus selects a cell for communication (e.g., a cell for reception of paging).

Also, for example, a base station performs handover decision. Specifically, a base station selects a target cell for a terminal apparatus, and decides to perform handover from a serving cell for the terminal apparatus to the target cell.

Also, for example, a base station performs addition of a secondary cell (SCell) of carrier aggregation. The SCell is also called a secondary component carrier (SCC).

Note that, as used herein, the term "cell" may mean the communication area of a base station, or a frequency band used by a base station. Also, as used herein, the term "cell" may mean a primary cell (PCell) or SCell of carrier aggregation. The PCell is also called a primary component carrier (PCC). The SCell is also called a secondary component carrier (SCC).

(b) Cell Selection where Beamforming is Performed

As described above, in a technical form called large-scale MIMO or massive MIMO, a base station performs beamforming using a directional antenna including a large number of antenna elements (e.g., about 100 antenna elements). In this case, a base station can change the direction of a beam not only in the horizontal direction but also in the vertical direction. Therefore, as an example, as shown in FIG. 3, a base station can form a beam aimed at a position higher than that of the base station (e.g., a higher floor in a high-rise building) to improve throughput at a high position. FIG. 3 is a diagram for describing an application example of large-scale MIMO beamforming. As another example, a small-size base station can form a beam for a nearby area so that its interference on an adjacent base station can be reduced.

Here, when the transmission and reception of a signal by large-scale MIMO beamforming becomes the mainstream, there will be a doubt as to whether cell selection could be performed on the basis of the result of measurements of a CRS.

Specifically, it is the quality of the transmission path of non-directional radio waves that can be determined on the basis of measurements of a CRS. However, the transmission path of non-directional radio waves is totally different from the transmission path of a sharp beam formed by large-scale MIMO beamforming. Therefore, when a signal is normally transmitted and received by the beamforming, a suitable cell may not be selected by cell selection which is performed on the basis of the result of measurements of a CRS.

As an example, when a terminal apparatus transmits and receives a signal in a cell which has been selected on the basis of the result of measurements of a CRS, significant interference may occur due to a sharp beam from an adjacent base station. As another example, even when the result of measurements of a CRS for a certain cell is better than that for another cell, then if beamforming is performed, the communication quality of the other cell may be better than that of the certain cell.

As described above, when beamforming is performed, a suitable cell for a terminal apparatus may fail to be selected.

(c) Case where Measurements of CRS are not Desirable

As described above, for example, it is considered that large-scale MIMO beamforming is performed by base stations in urban areas or base stations in small cells. Therefore, it is not desirable that cell selection for these base stations is performed on the basis of measurements of a CRS.

(Measurements without Influence of Beamforming)

In LTE, a CRS for acquiring RSRP and RSRQ is not multiplied by a weight set for beamforming in a base station. Therefore, a terminal apparatus can acquire a spatial channel H without the influence of beamforming, using a CRS. However, when large-scale MIMO beamforming is performed using a great gain, then if the beamforming is not applied to a CRS, RSRP and RSRQ acquired from a CRS does not correctly reflect a feature of the cell. Note that, as used herein, the feature of a cell refers to beamforming which is used in the cell.

Also, in LTE, a terminal apparatus acquires RSSI by receiving the total power of a CRS and other portions in addition to the CRS. The RSSI acquired by such a method is significantly affected by beamforming. Therefore, when an environment for beamforming is significantly changed, the RSSI is no longer a value correctly reflecting the feature of a cell, and RSRQ calculated using the RSSI does not correctly reflect the feature of a cell either.

(Necessity of Semi-Static Beamforming)

As described above, as to beamforming, measurements may not work in an environment which frequently changes between each resource block of each terminal apparatus. Therefore, in one embodiment of the present disclosure, a candidate for a weight set for beamforming which is used in a cell is set to semi-static. The term "set to semi-static" with respect to a weight set candidate means that the weight set candidate is set to static for each cell, but does not mean that the weight set candidate is set to static for each terminal apparatus. Note that a candidate for a weight set for beamforming which is used in a cell may be dynamically set if the candidate is known to a terminal apparatus. As a result, it can be said that beamforming which may affect measurements is semi-static, and RSSI, RSRP, and RSRQ which are measured in the static range correctly reflect the quality of the cell. As a result, in a communication system to which the technique according to the present disclosure is applied, measurements can correctly work in a cell in which beamforming is performed.

2. SCHEMATIC CONFIGURATION OF COMMUNICATION SYSTEM

Figure 4:
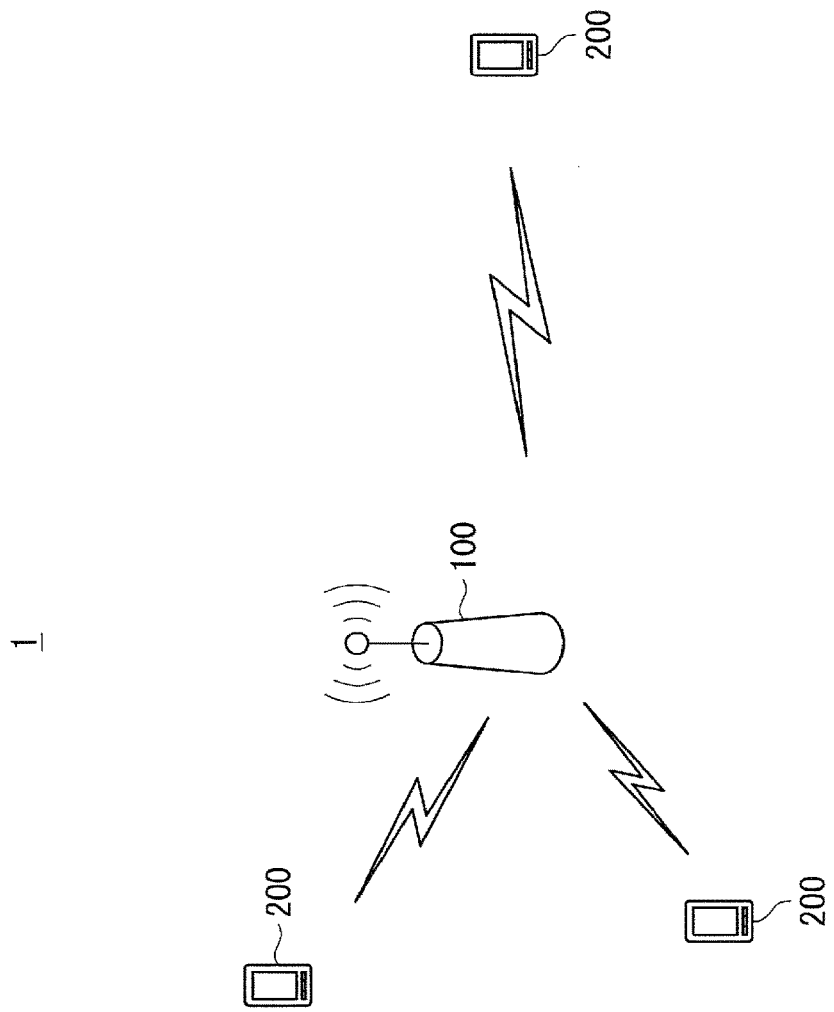
FIG. 4 is a diagram for describing an example of a schematic configuration of a communication system according to one embodiment of the present disclosure.

Next, a schematic configuration of a communication system 1 according to one embodiment of the present disclosure will be described with reference to FIG. 4 to FIG. 6. FIG. 4 is a diagram for describing an example of the schematic configuration of the communication system 1 according to one embodiment of the present disclosure. Referring to FIG. 4, the communication system 1 includes a base station 100 and one or more terminal apparatuses 200. The communication system 1 is a system which complies with, for example, LTE, LTE-Advanced, or similar communication standards.

The base station 100 wirelessly communicates with a terminal apparatus 200. For example, the base station 100 wirelessly communicates with a terminal apparatus 200 which is located in the communication area of the base station 100. In other words, when a terminal apparatus 200 is located in the communication area of the base station 100, the terminal apparatus 200 wirelessly communicates with the base station 100.

In particular, in an embodiment of the present disclosure, the base station 100 performs beamforming. For example, the beamforming is large-scale MIMO beamforming. The beamforming may also be called massive MIMO beamforming or three-dimensional beamforming.

Specifically, for example, the base station 100 includes a directional antenna which can be used in large-scale MIMO. Also, the base station 100 performs large-scale MIMO beamforming by multiplying a transmission signal by a weight set for the directional antenna. For example, the weight set is determined for each terminal apparatus 200. As a result, a beam aimed at each terminal apparatus 200 is formed. An example of large-scale MIMO beamforming will be described with reference to FIG. 5 and FIG. 6.

Figure 5:
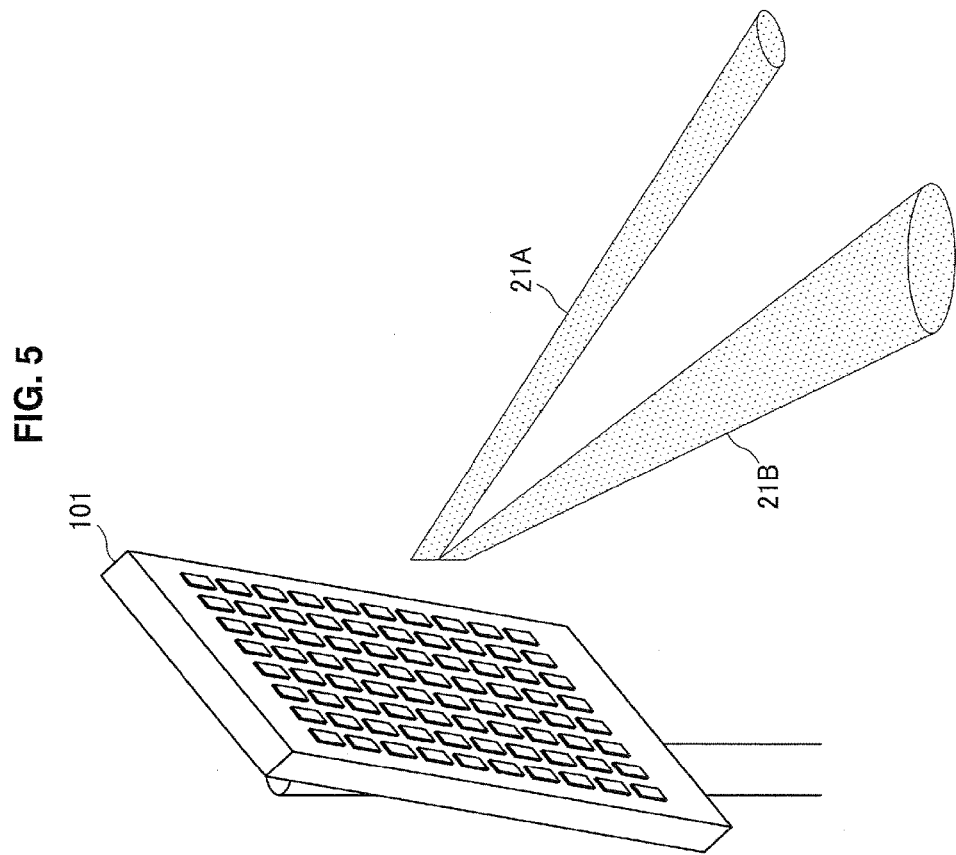
FIG. 5 is a first diagram for describing an example of large-scale MIMO beamforming.

FIG. 5 is a first diagram for describing an example of large-scale MIMO beamforming. FIG. 5 shows a directional antenna 101 which can be used in large-scale MIMO. The directional antenna 101 can form a sharp beam aimed in a desired three-dimensional direction. For example, the directional antenna 101 forms abeam 21A and abeam 21B.

Figure 6:
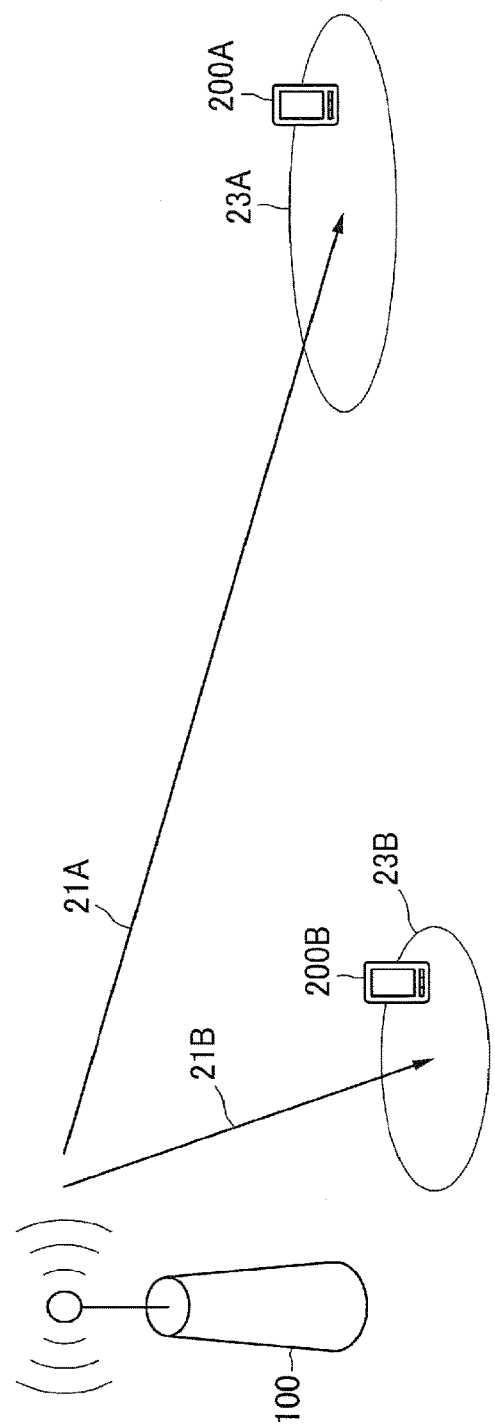
FIG. 6 is a first diagram for describing an example of large-scale MIMO beamforming.

FIG. 6 is a second diagram for describing an example of large-scale MIMO beamforming. FIG. 6 shows the beams 21A and 21B described with reference to FIG. 5. For example, the beam 21A reaches an area 23A, and the beam 21B reaches an area 23B. Therefore, a terminal apparatus 200A which is located in the area 23A can receive a signal which is transmitted as the beam 21A. Also, a terminal apparatus 200B which is located in the area 23B can receive a signal which is transmitted as the beam 21B. The base station 100 transmits a signal as the beam 21A to the terminal apparatus 200A, and transmits a signal as the beam 21B to the terminal apparatus 200B.

Note that the base station 100 can, for example, transmit a signal without performing beamforming. As a result, the base station 100 includes a non-directional antenna to transmit a signal in the form of non-directional radio waves. As another example, the base station 100 may include a sector antenna to transmit a signal in the form of a sector beam.

Each embodiment of the present disclosure will now be described in detail. In each embodiment of the present disclosure, when a terminal apparatus 200 receives a measurement reference signal which has been transmitted by the base station 100 using a plurality of transmission weights for beamforming, the terminal apparatus 200 performs measurements. In a first embodiment and a second embodiment, a transmitter (the base station 100) uses a plurality of transmission weights for beamforming. In a third embodiment, a receiver (a terminal apparatus 200) uses a plurality of transmission weights for beamforming.

3. FIRST EMBODIMENT

3-1. Configuration Example of Base Station

Firstly, a configuration of the base station 100 according to this embodiment will be described with reference to FIG. 7 to FIG. 14.

Figure 7:
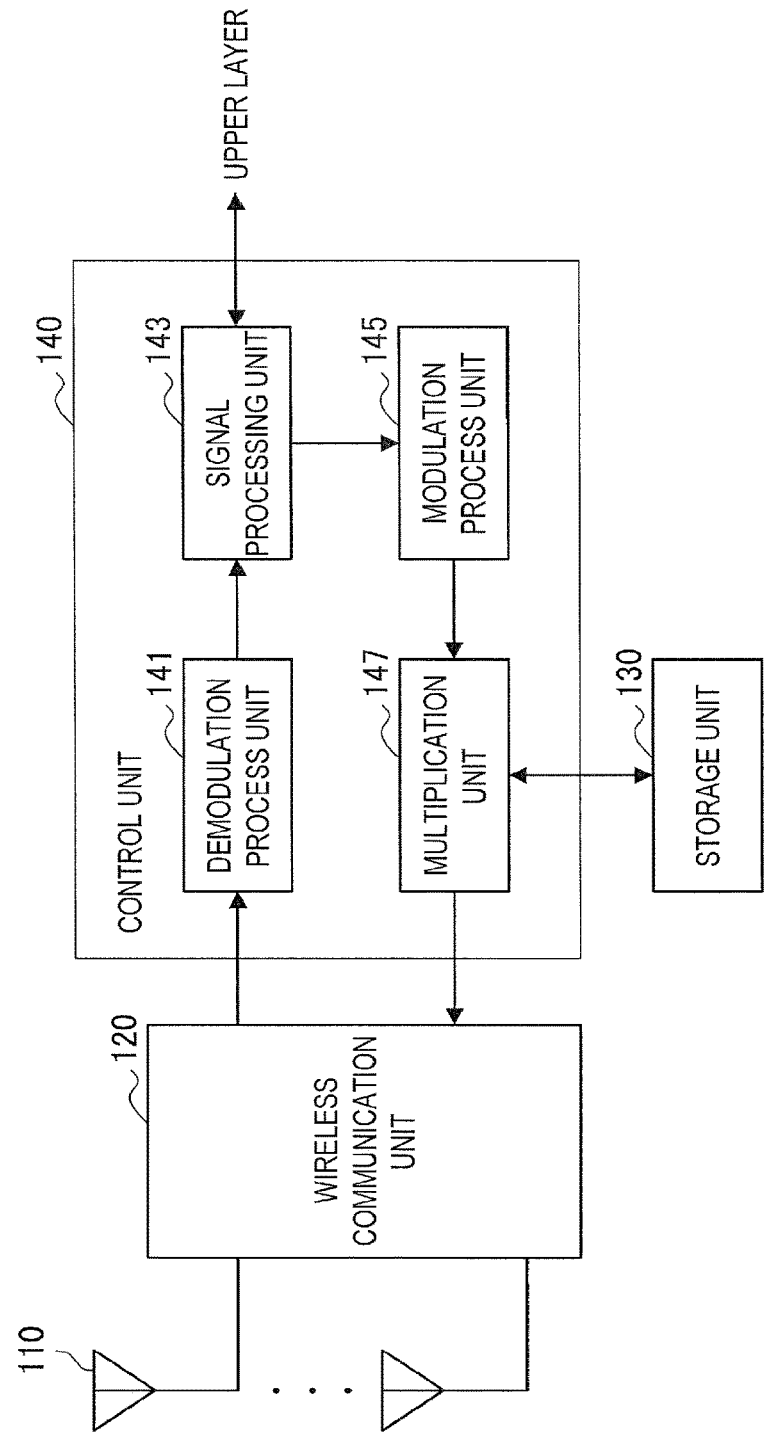
FIG. 7 is a block diagram showing an example of a logical configuration of a base station according to a first embodiment.

FIG. 7 is a block diagram showing an example of a logical configuration of the base station 100 according to this embodiment. As shown in FIG. 7, the base station 100 includes an antenna unit 110, a wireless communication unit 120, a storage unit 130, and a control unit 140.

(Antenna Unit 110)

The antenna unit 110 radiates a signal output by the wireless communication unit 120, in the form of radio waves, into space. The antenna unit 110 also converts radio waves in space into a signal, and outputs the signal to the wireless communication unit 120.

In particular, in an embodiment of the present disclosure, the antenna unit 110 includes a directional antenna. For example, the directional antenna is a directional antenna which can be used in large-scale MIMO.

Also, for example, the antenna unit 110 further includes a non-directional antenna. Note that the antenna unit 110 may include a sector antenna instead of or in addition to a non-directional antenna.

(Wireless Communication Unit 120)

The wireless communication unit 120 transmits and receives a signal. For example, the wireless communication unit 120 performs wireless communication with a terminal apparatus 200. Specifically, the wireless communication unit 120 transmits a downlink signal to a terminal apparatus 200, and receives an uplink signal from the terminal apparatus 200. The wireless communication unit 120 may function as an analog processing unit, an AD/DA conversion unit, or the like.

In particular, the wireless communication unit 120 according to this embodiment transmits a measurement reference signal to which a plurality of transmission weights for beamforming have been applied. Note that the measurement reference signal to which a plurality of transmission weights for beamforming have been applied, means a measurement reference signal to which a candidate set for a weight set has been applied (i.e., multiplied).

(Storage Unit 130)

The storage unit 130 stores a program and data for operation of the base station 100. The storage unit 130 according to this embodiment stores information indicating a candidate set for a weight set described below.

(Control Unit 140)

The control unit 140 controls the entire base station 100 so that various functions of the base station 100 are provided. As shown in FIG. 7, the control unit 140 includes a demodulation process unit 141, a signal processing unit 143, a modulation process unit 145, and a multiplication unit 147. Note that, in addition to these components, the control unit 140 may include other components. In other words, in addition to the operations of the above components, the control unit 140 may perform other operations.

(Demodulation Process Unit 141)

The demodulation process unit 141 may perform the process of demodulating a received signal supplied from the wireless communication unit 120. The demodulation process performed by the demodulation process unit 141 may include an OFDM demodulation process, an MIMO demodulation process, error correction, and the like.

(Signal Processing Unit 143)

The signal processing unit 143 performs the process of receiving and outputting transmission data and reception data from and to an upper layer, the process of controlling the modulation process unit 145 and the multiplication unit 147, and the like.

(Modulation Processing Unit 145)

The modulation process unit 145 performs a modulation process such as mapping based on a constellation, or the like, on transmission data supplied from the signal processing unit 143. The transmission signal modulated by the modulation process unit 145 is supplied to the multiplication unit 147. The modulation process unit 145 also performs mapping of a measurement reference signal to wireless resources.

For example, the modulation process unit 145 may map a measurement reference signal to which a candidate set for a weight set is to be applied by the multiplication unit 147 described below, to a CRS transmission resource element. In this case, a region to which a measurement signal is mapped remains unchanged. Therefore, for example, even a terminal apparatus (legacy apparatus) to which the technique of this embodiment is not applied can perform the measurements according to this embodiment. Therefore, backward compatibility is ensured.

The measurement reference signal is, for example, a cell-specific signal. As an example, the measurement reference signal is a signal having the same sequence as that of a CRS. Alternatively, the measurement reference signal may be another cell-specific signal which is similar to a CRS. As a result, for example, measurements for cell selection can be performed.

The measurements in the terminal apparatus 200 are RRM measurements, and measurements of received power or reception quality. More specifically, for example, the measurements in the terminal apparatus 200 are measurements of RSRP or RSRQ.

(Multiplication Unit 147)

The multiplication unit 147 has the function of performing beamforming by applying (multiplying) a transmission signal by a weight set during execution of MU-MIMO. Specifically, the multiplication unit 147 multiplies a signal containing user data by a weight set suitable for each terminal apparatus 200. Also, the multiplication unit 147 multiplies a measurement reference signal by a candidate set for a weight set.

(a) Candidate Set for Weight Set

One weight set is represented by V(i), where i is any integer of 1 to M, and M is the number of all candidates for a weight set. A universal set V which contains all weight sets available for the base station 100 is represented by the following formula.

[Math. 3]

$$V = \{V(1), V(2), \ldots, V(M)\} \quad \text{Formula (3)}$$

If the multiplication unit 147 applies all the weight sets V(i) contained in the universal set V to a measurement reference signal, beamforming is performed for all directions, the resultant measurement reference signal has non-directivity like a typical CRS. This is the same situation where a measurement reference signal is without the influence of beamforming. Therefore, it is difficult for a terminal apparatus to recognize the feature of a cell even by performing measurements based on a measurement reference signal.

Therefore, the multiplication unit 147 according to this embodiment applies a candidate set which is a set of weight sets V(i). A plurality of weight sets V(i) which form a candidate set are some of the universal set V of the weight sets V(i) that are particularly used in the base station 100. As a result, a measurement reference signal is transmitted in one or more directions in the form of a superposition of one or more beams which are particularly formed in the base station 100. Therefore, the measurement reference signal is affected by the influence of beamforming, so that a terminal apparatus can recognize the feature of the cell by performing measurements based on the measurement reference signal. Note that the term "weight set particularly used" means a weight set which is statically used by the base station 100 so that a beam is aimed at, for example, a higher floor of a surrounding building depending on a surrounding static environment. Alternatively, for example, the term "weight set particularly used" may mean a weight set which is used highly frequently or many times. A specific example of a candidate set for a weight set will now be described with reference to FIG. 8 and FIG. 9.

Figure 8:
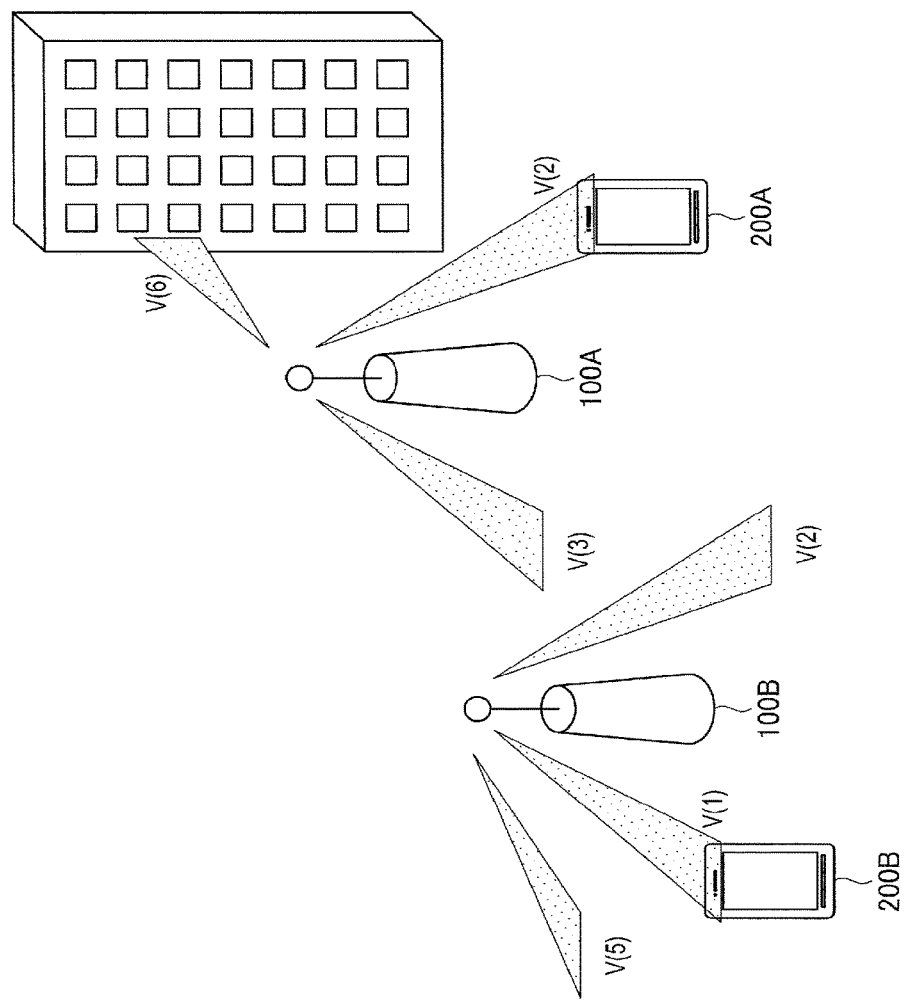
FIG. 8 is a diagram for describing an example of a candidate set for a weight set.
Figure 9:
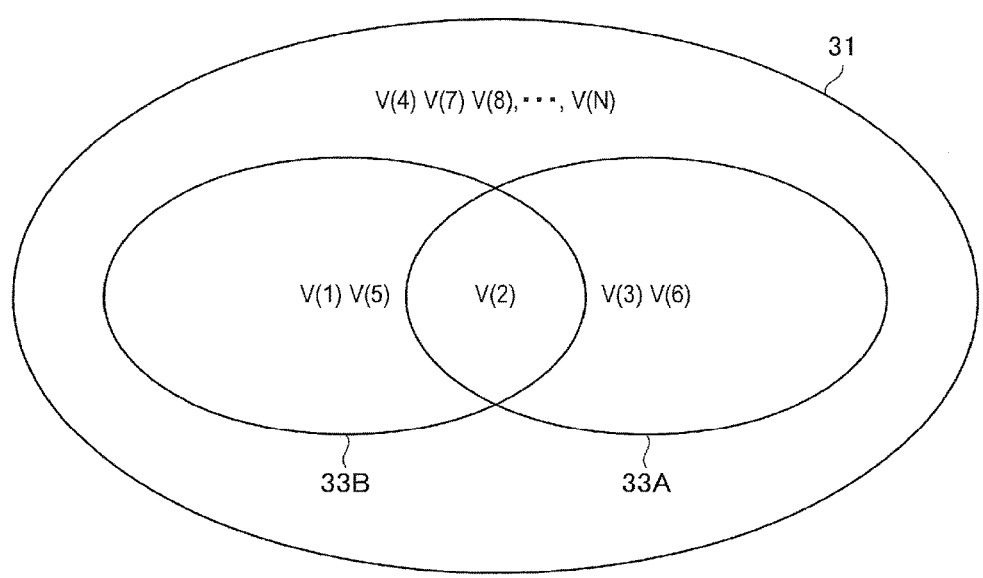
FIG. 9 is a diagram for describing an example of a candidate set for a weight set.

FIG. 8 and FIG. 9 are diagrams for describing an example of a candidate set for a weight set. In an example shown in FIG. 8 and FIG. 9: a base station 100A, a base station 100B, a terminal apparatus 200A, and a terminal apparatus 200B are involved. As shown in FIG. 8, the base station 100A forms a beam, particularly using the weight set V(2). V(3), or V(6). Also, the base station 100B forms a beam, particularly using the weight set V(1), V(2), or V(5). Therefore, a candidate set $V_A$ for the base station 100A and a candidate set $V_B$ for the base station 100B are represented by the following respective formulas.

[Math. 4]

$$V_A = \{V(2), V(3), V(6)\} \quad \text{Formula (4)}$$

[Math. 5]

$$V_B = \{V(1), V(2), V(5)\} \quad \text{Formula (5)}$$

In FIG. 9, the universal set V is indicated by a symbol 31, the candidate set $V_A$ is indicated by a symbol 33A, and the candidate set $V_B$ is indicated by a symbol 3313.

The base station 100A, when transmitting data to each user using, for example, a physical downlink shared channel (PDSCH), uses V(2) or V(3) according to the location of the terminal apparatus 200. The same applies to a case where control information is transmitted to each user using a physical downlink control channel (PDCCH). The candidate set $V_A$ can be regarded as the universal set of weight sets V(i) which are particularly used by the base station 100A. The same applies to the candidate set $V_B$.

(b) Correspondence Between Wireless Resource and Weight Set

The multiplication unit 147 multiplies a suitable weight set for each wireless resource.

The base station 100 employs, for example, orthogonal frequency division multiplexing (OFDM), and uses a resource block as a unit of wireless resources. The resource block is a wireless resource which contains 12 sub-carriers in the frequency direction and 7 OFDM symbols in the time direction.

For example, the multiplication unit 147 applies a weight set suitable for a terminal apparatus 200 as a destination to a resource element in the resource block to which user data has been mapped. Also, the multiplication unit 147 applies a candidate set for a weight set which is particularly used in the cell, to a resource element in the resource block to which a measurement reference signal has been mapped. A specific example of a correspondence relationship between a wireless resource and a weight set will now be described with reference to FIG. 10 and FIG. 11.

Figure 10:
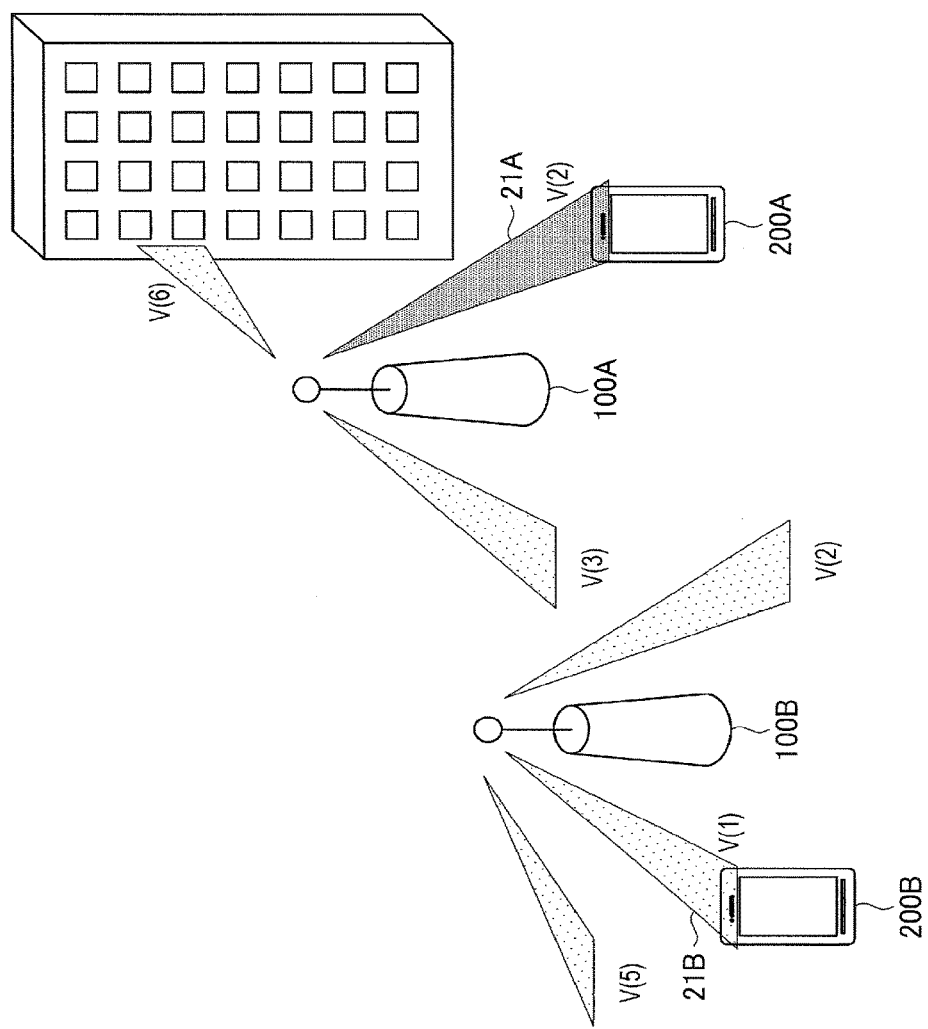
FIG. 10 is a diagram for describing a first example of a correspondence relationship between a wireless resource and a weight set.

FIG. 10 is a diagram for describing a first example of a correspondence relationship between a wireless resource and a weight set. As shown in FIG. 10, a terminal apparatus 200A is located in an area which can be reached by a beam 21A. Therefore, the multiplication unit 147 of the base station 100A forms the beam 21A by applying the weight set V(2) as a signal to be transmitted to a terminal apparatus 200A as a destination. A specific example of a wireless resource used in transmission of a signal to be transmitted to the terminal apparatus 200A as a destination will be shown in FIG. 11.

FIG. 11 is a diagram for describing a first example of a correspondence relationship between a wireless resource and a weight set. FIG. 11 shows a specific example of a resource block which is used in transmission of a signal which is to be transmitted to the terminal apparatus 200A as a destination. As shown in FIG. 11, a measurement reference signal is mapped to a CRS transmission resource element. The multiplication unit 147 applies the weight sets V(2), V(3), and V(6) contained in the candidate set $V_A$ of the base station 100A to the measurement reference signal which has been mapped to a CRS transmission resource element. As a result, the base station 100A can transmit the measurement reference signal to which directivity has been imparted using V(2), V(3), and V(6).

Also, as shown in FIG. 11, the multiplication unit 147 applies the weight set V(2) to a resource element to which UE specific reference signal has been mapped.

Next, another specific example of a correspondence relationship between a wireless resource and a weight set will be described with reference to FIG. 12 and FIG. 13.

Figure 12:
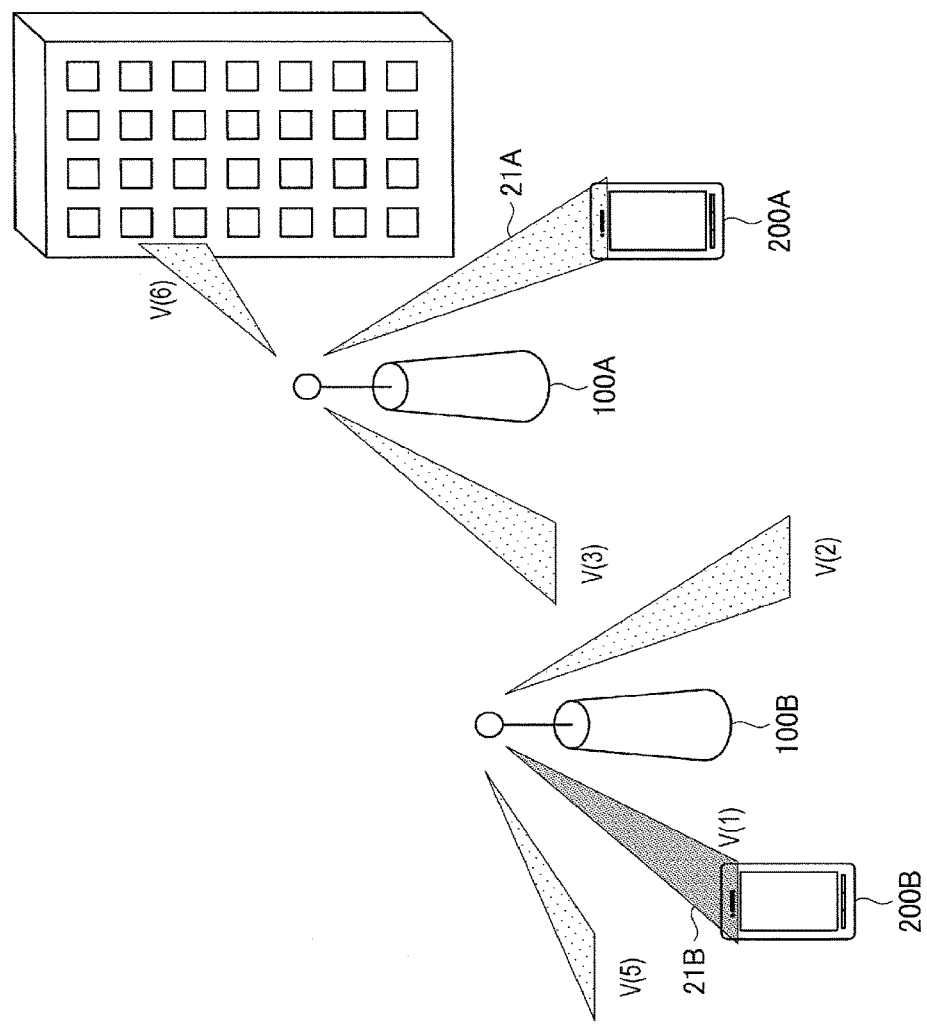
FIG. 12 is a diagram for describing a second example of a correspondence relationship between a wireless resource and a weight set.

FIG. 12 is a diagram for describing a second example of a correspondence relationship between a wireless resource and a weight set. As shown in FIG. 12, a terminal apparatus 200B is located in an area which can be reached by a beam 21B. Therefore, the multiplication unit 147 of a base station 100B forms the beam 21B by applying the weight set V(1) as a signal which is to be transmitted to the terminal apparatus 200B as a destination. A specific example of a wireless resource used in transmission of a signal to be transmitted to the terminal apparatus 200B as a destination will be shown in FIG. 13.

FIG. 13 is a diagram for describing a second example of a correspondence relationship between a wireless resource and a weight set. FIG. 13 shows a specific example of a resource block which is used in transmission of a signal which is to be transmitted to a terminal apparatus 200B as a destination. As shown in FIG. 13, a measurement reference signal is mapped to a CRS transmission resource element. The multiplication unit 147 applies the weight sets V(1), V(2), and V(5) contained in the candidate set $V_B$ of a base station 100B to the measurement reference signal which has been mapped to a CRS transmission resource element. As a result, the base station 100B can transmit the measurement reference signal to which directivity has been imparted using V(1), V(2), and V(5).

Also, as shown in FIG. 13, the multiplication unit 147 applies the weight set V(1) to a resource element to which a UE specific reference signal has been mapped.

In the foregoing, a specific example of a correspondence relationship between a wireless resource and a weight set has been described. Although, in FIG. 11 and FIG. 13, a resource element to which a measurement reference signal is mapped is assumed to be similar to a CRS in the LTE standard, the technique of the present disclosure is not limited to this example. For example, a measurement reference signal may be mapped to a plurality of successive sub-carriers and/or a plurality of successive OFDM symbols. The same applies to a UE specific reference signal.

(c) Multiplication of Weight Coefficients

The multiplication unit 147 applies a candidate set for a weight set to a measurement reference signal which has been mapped to a wireless resource. Specifically, the multiplication unit 147 multiplies a measurement reference signal by the sum of all weight sets contained in a candidate set. For example, in the example shown in FIG. 10 and FIG. 11, the multiplication unit 147 of the base station 100A multiplies a measurement reference signal by V(2)+V(3)+V(6).

A weight set is a set of weight coefficients for a plurality of antenna elements. For each antenna element, the multiplication unit 147 multiplies a measurement reference signal by a weight coefficient corresponding to the antenna element. A specific example of this will now be described with reference to FIG. 14. A specific example of this will now be described with reference to FIG. 14.

Figure 14:
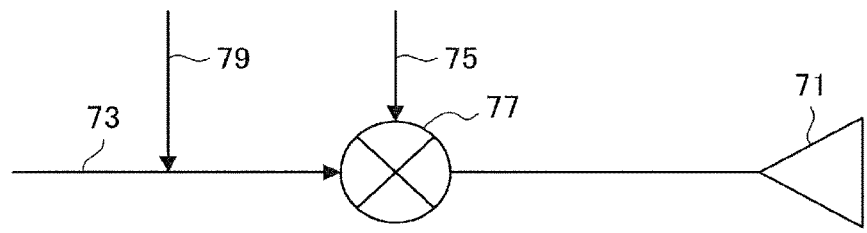
FIG. 14 is a diagram for describing multiplication of a measurement reference signal by weight coefficients.

FIG. 14 is a diagram for describing multiplication of a measurement reference signal by weight coefficients. Referring to FIG. 14, the multiplier 77 complex-multiplies a transmission signal 73 corresponding to each antenna element 71 by a weight coefficient 75. Thereafter, the transmission signal 73 multiplied by the weight coefficient 75 is transmitted from the antenna element 71. Also, a measurement reference signal 79 is inserted before the multiplier 77 (i.e., mapped to a wireless resource), and the multiplier 77 complex-multiplies the measurement reference signal 79 by the weight coefficient 75. Therefore, the measurement reference signal 79 complex-multiplexed by the weight coefficient 75 is transmitted from the antenna element 71.

As a specific example, referring back to FIG. 11, a measurement reference signal mapped to a CRS transmission resource element is multiplied by the candidate set $V_A$ for a weight set, i.e., V(2)+V(3)+V(6). Also, referring back to FIG. 13, a measurement reference signal mapped to a CRS transmission resource element is multiplied by the candidate set $V_B$ for a weight set, i.e., V(1)+V(2)+V(5).

As described above, the multiplication unit 147 multiplies a measurement reference signal by a weight set which is particularly used by the base station 100. As a result, for example, when beamforming is performed, a cell suitable for a terminal apparatus 200 can be selected.

More specifically, for example, a terminal apparatus 200 can measure a measurement reference signal multiplied by a beamforming weight set instead of a CRS which is to be transmitted in the form of non-directional radio waves. In other words, a terminal apparatus 200 can measure the quality of the transmission path of a directional beam instead of the quality of the transmission path of non-directional radio waves. Therefore, the base station 100 or the terminal apparatus 200 can select a cell having a good directional beam transmission path, for example.

In the foregoing, a configuration example of the multiplication unit 147 has been described.

(Supplements)

In addition, the control unit 140 may have various functions. An example of functions which may be possessed by the control unit 140 will now be described.

(a) Cell Selection

For example, the control unit 140 selects a cell for a terminal apparatus 200 on the basis of a report on measurements performed by the terminal apparatus 200. Specifically, the control unit 140 selects a cell for a terminal apparatus 200 on the basis of measurement report information provided in a report on measurements performed by the terminal apparatus 200.

(b) Cell

For example, the base station 100 supports carrier aggregation. In this case, the above cell is a PCell (i.e., PCC) or SCell (i.e., SCC) of carrier aggregation.

Note that the base station 100 may not support carrier aggregation. In this case, the above cell may mean the communication area of the base station 100, or a frequency band used by the base station 100.

(c) Handover Decision

For example, the control unit 140 decides handover of a terminal apparatus 200. Specifically, the control unit 140 performs handover decision with respect to a terminal apparatus 200. The control unit 140 selects a target cell for a terminal apparatus 200 during handover decision.

More specifically, for example, the control unit 140 selects a target cell for a terminal apparatus 200 on the basis of a report on measurements performed by the terminal apparatus 200, and decides handover to the target cell. As described below, the measurement report is a report which is performed on the basis of the result of the above measurements of a measurement reference signal.

For example, the base station 100 supports carrier aggregation, and the above handover is handover of a PCell (i.e., PCC) of carrier aggregation. Also, the above target cell is a new PCell (i.e., PCC).

Note that the base station 100 may not support carrier aggregation, and the above handover may be handover between base stations or handover between frequencies.

(d) Addition of SCell

For example, the control unit 140 performs addition of an SCell (i.e., SCC) for a terminal apparatus 200. The control unit 140 selects an SCell to be added.

More specifically, for example, the control unit 140 selects an SCell for a terminal apparatus 200 on the basis of a report on measurements performed by the terminal apparatus 200, and performs activation of the SCell. As described above, the measurement report is a report which is performed on the basis of the result of the above measurements of a measurement reference signal.

In the foregoing, a configuration example of the base station 100 according to this embodiment has been described. Next, a configuration example of the terminal apparatus 200 according to this embodiment will be described with reference to FIG. 15.

3-2. Configuration Example of Terminal Apparatus

Figure 15:
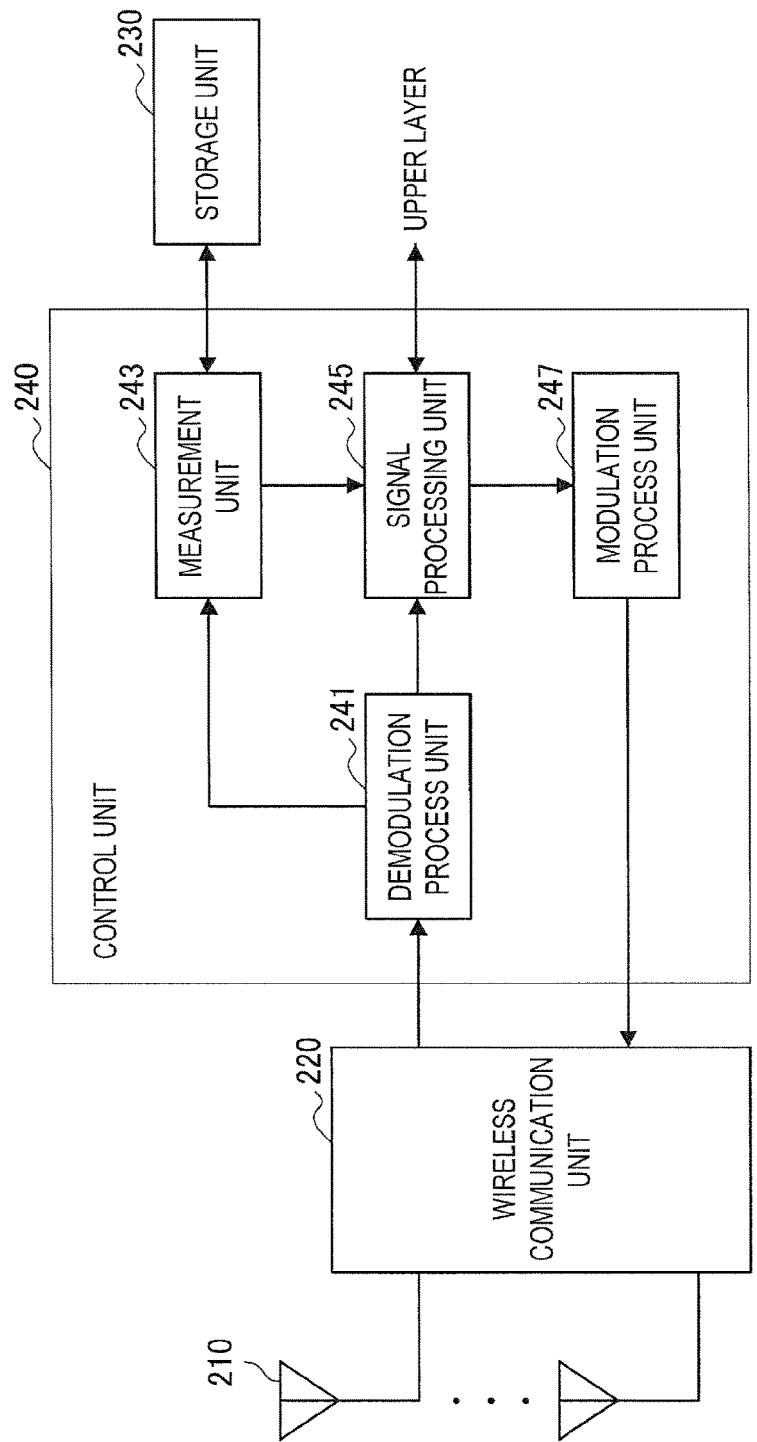
FIG. 15 is a block diagram showing an example of a logical configuration of a terminal apparatus according to the first embodiment.

FIG. 15 is a block diagram showing an example of a logical configuration of the terminal apparatus 200 according to this embodiment. As shown in FIG. 15, the terminal apparatus 200 has an antenna unit 210, a wireless communication unit 220, a storage unit 230, and a control unit 240.

(Antenna Unit 210)

The antenna unit 210 radiates a signal output by the wireless communication unit 220, in the form of radio waves, into space. The antenna unit 210 also converts radio waves in space into a signal, and outputs the signal to the wireless communication unit 220.

(Wireless Communication Unit 220)

The wireless communication unit 220 transmits and receives a signal. For example, the wireless communication unit 220 performs wireless communication with the base station 100. Specifically, the wireless communication unit 220 receives a downlink signal to the base station 100, and transmits an uplink signal to the base station 100.

In particular, the wireless communication unit 220 according to this embodiment receives a measurement reference signal to which a plurality of transmission weights for beamforming have been applied (i.e., a candidate set for a weight set has been applied).

(Storage Unit 230)

The storage unit 230 stores a program and data for operation of the terminal apparatus 200.

(Control Unit 240)

The control unit 240 controls the entire terminal apparatus 200 so that various functions of the terminal apparatus 200 are provided. As shown in FIG. 15, the control unit 240 includes a demodulation process unit 241, a measurement unit 243, a signal processing unit 245, and a modulation process unit 247. Note that, in addition to these components, the control unit 240 may include other components. In other words, in addition to the operations of the above components, the control unit 240 may perform other operations.

(Demodulation Process Unit 241)

The demodulation process unit 241 may perform the process of demodulating a received signal supplied from the wireless communication unit 220. The demodulation process performed by the demodulation process unit 241 may include an OFDM demodulation process, an MIMO demodulation process, error correction, and the like.

(Measurement Unit 243)

The measurement unit 243 performs measurements on a measurement reference signal to which a candidate set for a weight so has been applied.

The measurement unit 243 acquires a channel for a measurement reference signal to which a candidate set for a weight set has been applied and which has been received by the wireless communication 220, and calculates the received power of the measurement reference signal. The received power is, for example, RSRP. For example, in the example shown in FIG. 10 and FIG. 11, the RSRP of the measurement reference signal measured by the measurement unit 243 of the terminal apparatus 200A is represented by the following formula.

[Math. 6]

$$RSRP = H(V(2)+V(3)+V(6)) \quad \text{Formula (6)}$$

Here. H is a spatial channel. The spatial channel H is a channel in a situation where the transmitter does not perform beamforming.

Also, the measurement unit 243 calculates the reception quality of a measurement reference signal to which a candidate set for a weight set has been provided on the basis of the received power of the measurement reference signal. The reception quality is, for example, RSRQ. RSRQ measured by the measurement unit 243 is represented by the following formula.

[Math. 7]

$$RSRQ = RSRP/(RSSI/N) \quad \text{Formula (4)}$$

Here. N is the number of resource blocks used in calculation of RSSI.

RSSI in formula (7) is measured, which is affected by, for example, a signal containing user data which has been transmitted using a weight set contained in a candidate set for a weight set which is particularly used in a cell to be measured. Therefore it can be said that RSSI reflects the feature of a cell to be measured. Moreover, it can be said that RSRQ calculated using the RSSI also reflects the feature of a cell to be measured.

Also, RSSI in formula (7) may receive an interference signal from the base station 100 which is not to be measured, which has been transmitted using a weight set contained in a candidate set for a weight set which is particularly used in a cell which is not to be measured. Therefore, it can be said that RSSI reflects interference by a beamformed signal from a cell which is not to be measured Therefore, RSRQ calculated using formula (7) is affected by the influence of beamforming in an adjacent cell.

Thus, according to this embodiment. RSRP and RSRQ are measured using a measurement reference signal which has been weighted by a candidate set for a weight set which is particularly used in the cell. Therefore, RSRP and RSRQ reflect the feature of the cell. Therefore, cell selection based on RSRP or RSRQ according to this embodiment is appropriate even when beamforming is performed.

Also, even in a terminal apparatus (legacy apparatus) to which the technique of this embodiment is not applied, a measurement reference signal transmitted from the base station 100 is weighted using a candidates set for a weight set which is particularly used in the cell, and therefore. RSRP which reflects the feature of the cell can be measured. Therefore, backward compatibility is ensured. Note that, in the legacy apparatus, power can be measured over an entire band when RSSI is acquired, where a measurement reference signal and other signals are included.

In the measurement according to this embodiment, RSRP and RSRQ are measured on the basis of a measurement reference signal. Therefore, not only RRC connected terminal apparatuses 200 but also RRC idle terminal apparatuses 200 can perform this measurement.

(Signal Processing Unit 245)

The signal processing unit 245 performs the process of receiving and outputting transmission data and reception data from and to an upper layer, the process of controlling the modulation process unit 247, and the like.

(Modulation Processing Unit 247)

The modulation process unit 247 performs a modulation process such as mapping based on a constellation, or the like, on transmission data supplied from the signal processing unit 245. The transmission signal modulated by the modulation process unit 247 is supplied to the multiplication unit 220.

(Supplements)

In addition, the control unit 240 may have various functions. An example of functions which may be possessed by the control unit 240 will now be described. Note that these functions may be provided by, for example, the signal processing unit 245.

(a) Reporting

For example, the control unit 240 performs measurement reporting to the base station 100 on the basis of the result of the above measurements.

(a-1) Event-Triggered Reporting

For example, the control unit 240 performs measurement reporting to the base station 100, depending on an event related to the result of the above measurements.

Event

The above event is, for example, one or more events of events A1 to A6 and events B1 and B2 specified in the 3GPP. Alternatively, the above event may be one or more events each of which is similar to any of events A1 to A6 and events B1 and B2 specified in the 3GPP.

Measurement Reporting

Information Provided to Base Station 100

For example, the control unit 240 performs measurement reporting to the base station 100 by providing measurement report information to the base station 100.

For example, the measurement report information contains the result of the above measurements. More specifically, the measurement report information contains, for example, RSRP and/or RSRQ.

Also, for example, the measurement report information contains cell identification information (e.g., a cell ID) of a cell to which a measurement reference signal has been transmitted.

Also, for example, the measurement report information contains information indicating that measurement reporting is based on the result of measurements of a measurement reference signal multiplied by a weight set.

(a-2) Periodic Reporting

For example, the control unit 240 periodically performs measurement reporting to the base station 100.

Interval

As an example, the control unit 240 performs measurement reporting to the base station 100 at intervals specified by the base station 100. As another example, the control unit 240 may perform measurement reporting to the base station 100 at predetermined intervals.

Measurement Reporting

For example, the control unit 240 performs measurement reporting to the base station 100 by providing measurement report information to the base station 100. The specific contents of the measurement report information are the same as those of the measurement report information described in relation to the event-triggered reporting, and will not be described herein.

As described above, the control unit 240 performs measurement reporting to the base station 100 on the basis of the result of the above measurements. As a result, for example, when beamforming is performed, the base station 100 can select a suitable cell for a terminal apparatus 200.

(b) Cell Selection

The control unit 240 selects a cell for a terminal apparatus 200 on the basis of the result of the above measurements.

For example, when a terminal apparatus 200 is in the idle state, the control unit 240 performs cell selection/cell reselection on the basis of the result of the above measurements. More specifically, for example, when a terminal apparatus 200 is RRC idle, the control unit 240 selects a cell for communication performed by a terminal apparatus 200 (e.g., a cell for paging reception) on the basis of the result of the above measurements.

For example, the base station 100 supports carrier aggregation. In this case, the above cell is a PCell (i.e., PCC) of carrier aggregation.

Note that the base station 100 may not support carrier aggregation. In this case, the above cell may mean the communication area of the base station 100, or a frequency band used by the base station 100.

In the foregoing, a configuration example of the terminal apparatus 200 according to this embodiment has been described. Next, an operation process of the communication system 1 according to this embodiment will be described with reference to FIG. 16.

3-3. Operation Process

Figure 16:
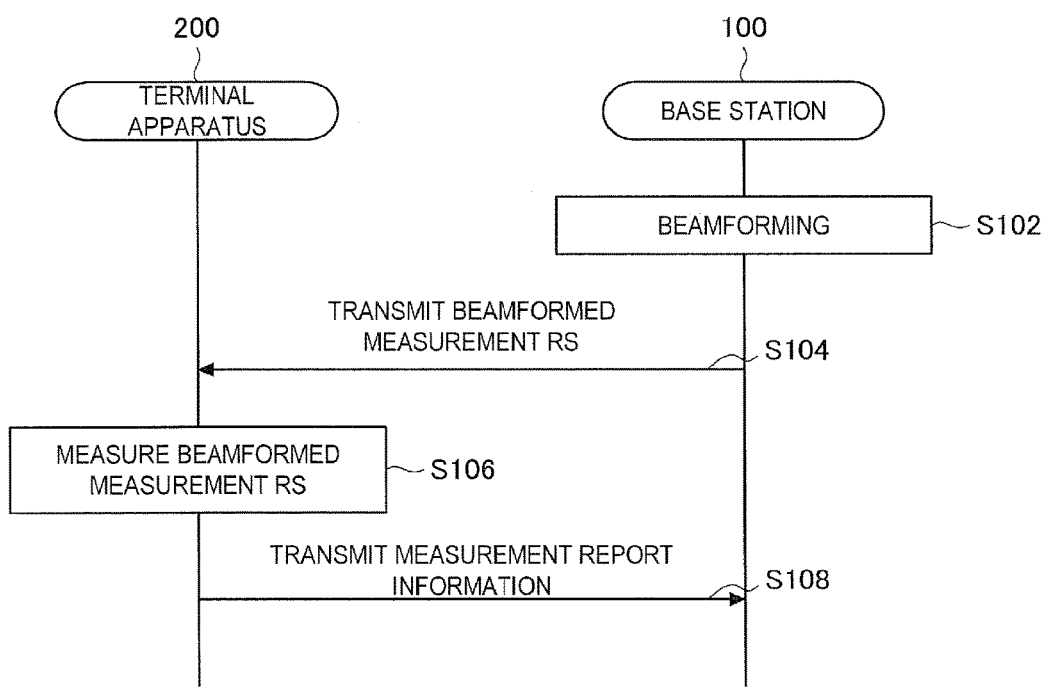
FIG. 16 is a sequence diagram showing an example of a measurement process performed in a communication system according to the first embodiment.

FIG. 16 is a sequence diagram showing an example of a measurement process performed in the communication system 1 according to this embodiment. The base station 100 and the terminal apparatus 200 are involved with the sequence shown in FIG. 16.

As shown in FIG. 16, initially, in step S102, the base station 100 performs beamforming. Specifically, initially, the modulation process unit 145 maps a measurement reference signal to a CRS transmission resource element. Thereafter, the multiplication unit 147 multiplies the measurement reference signal by a candidate set for a weight set. For example, in the example shown in FIG. 10 and FIG. 11, the multiplication unit 147 multiplies the measurement reference signal by the sum of all elements in the candidate set $V_A$, i.e., $V(2)+V(3)+V(6)$.

Next, in step S104, the base station 100 transmits the beamformed measurement reference signal (measurement RS) to the terminal apparatus 200. Specifically, the wireless communication unit 120 transmits the measurement reference signal output from the control unit 140 through the antenna unit 110. The transmitted measurement reference signal has directivity in one or more directions indicated by one or more weight sets contained in a candidate set.

Next, in step S106, the terminal apparatus 200 measures the beamformed measurement reference signal. Specifically, the measurement unit 243 measures a channel for the reference signal received from the wireless communication unit 220. For example, in the example shown in FIG. 10 and FIG. 11, the measurement unit 243 measures $H(V(2)+V(3)+V(6))$. Also, the measurement unit 243 measures RSSI. Thereafter, the measurement unit 243 calculates RSRP using formula (6), and calculates RSRQ using formula (7).

Thereafter, in step S108, when a terminal apparatus 200 is RRC connected, the terminal apparatus 200 performs measurement reporting to the base station 100 by providing measurement report information to the base station 100. Specifically, in step S106, the control unit 240 transmits measurement report information containing RSRP and/or RSRQ measured by the measurement unit 243 to the base station 100.

4. SECOND EMBODIMENT

4-1. Overview

In the first embodiment, a measurement reference signal to which a candidate set for a weight set has been applied is used instead of a CRS. Therefore, in a terminal apparatus 200, a spatial channel H multiplied by a candidate set for a weight set is measured instead of the original spatial channel H. Therefore, in the first embodiment, it is difficult to perform operation which requires the original spatial channel H.

For example, in the communication system 1 according to the first embodiment, it is difficult to use Transmission Modes 4, 5, and 6 of LTE, which are defined in the 3GPP. In these operation modes, a spatial channel H multiplied by one weight set is compared with the spatial channel H multiplied by another weight set, whereby evaluation is performed for each weight set. A spatial channel H multiplied by a candidate set for a weight set, which is measured in the first embodiment, is difficult to do such evaluation.

Therefore, in this embodiment, a base station 100 transmits a measurement reference signal to which a candidate set for a weight set according to the first embodiment has been applied, and in addition, a measurement reference signal to which a candidate set for a weight set has not been applied.

4-2. Configuration Example of Base Station

A base station 100 has a configuration similar to that of the first embodiment. Note that the control unit 140 according to this embodiment controls the wireless communication unit 120 so that the wireless communication unit 120 transmits a measurement reference signal before application of a plurality of transmission weights for beamforming. Note that the measurement reference signal before application of a plurality of transmission weights for beamforming means the measurement reference signal to which a plurality of transmission weights for beamforming have not been applied (i.e., multiplied). A characteristic configuration of this embodiment will now be described.

(Signal Processing Unit 143)

The signal processing unit 143 outputs weight set information indicating a candidate set for a weight set for the base station 100, as transmission data, to the modulation process unit 145 according to an instruction from an upper layer. The weight set information may contain, for example, weight sets themselves contained in a candidate set, or indexes indicating the weight sets. As a result, a terminal apparatus 200 can know and acquire a weight set which is particularly used by the base station 100. Note that the base station 100 may transmit system information containing the weight set information to a terminal apparatus 200.

(Modulation Processing Unit 145)

As in the first embodiment, the modulation process unit 145 according to this embodiment maps a measurement reference signal to which a candidate set for a weight set is to be applied to a wireless resource. In addition to this, the modulation process unit 145 maps a measurement reference signal to which a candidate set for a weight set is not applied to a wireless resource. Note that these measurement reference signals may have the same or different sequences.

For example, the modulation process unit 145 maps a measurement reference signal to which a candidate set for a weight set is not applied to a resource element which is different from one for CRS transmission. A mapping example of a measurement reference signal to which a candidate set for a weight set is not applied, in the example shown in FIG. 10, will now be described with reference to FIG. 17.

FIG. 17 is a diagram for describing an example of mapping of a measurement reference signal according to this embodiment. As shown in FIG. 17, a measurement reference signal to which a candidate set for a weight set is to be applied is mapped to a CRS transmission resource element. Also, a measurement reference signal to which a candidate set for a weight set is not applied is mapped to a newly provided resource element for a reference signal.

As another result, the modulation process unit 145 may map a measurement reference signal to which a candidate set for a weight set is not applied to a CRS transmission resource element, and a measurement reference signal to which a candidate set for a weight set is to be applied to a resource element which is different from one for CRS transmission. In this case, a terminal apparatus (legacy apparatus) to which the technique of this embodiment is not applied can perform existing measurements.

(Multiplication Unit 147)

The multiplication unit 147 multiplies a measurement reference signal to which a candidate set for a weight set is to be applied, by a candidate set for a weight set. Meanwhile, the multiplication unit 147 does not multiply a measurement reference signal to which a candidate set for a weight set is not to be applied, by a weight set. Also, the multiplication unit 147 multiplies a signal containing user data by a weight set suitable for each terminal apparatus 200. The processes of the multiplication unit 147 will now be described with reference back to FIG. 17.

As shown in FIG. 17, the multiplication unit 147 applies the weight sets V(2), V(3), and V(6) contained in the candidate set $V_A$ of a base station 100A to a measurement reference signal which has been mapped to a CRS transmission resource element. As a result, the base station 100A can transmit a measurement reference signal to which directivity has been imparted using V(2), V(3), and V(6).

Also, as shown in FIG. 17, the multiplication unit 147 does not apply any weight set to a measurement reference signal which has been mapped to a newly provided resource element for a reference signal. As a result, the base station 100A can transmit a measurement reference signal which does not have directivity.

Also, as shown in FIG. 17, the multiplication unit 147 applies the weight set V(2) to a resource element to which a UE specific reference signal has been mapped.

In the foregoing, a configuration example of the base station 100 according to this embodiment has been described. Next, a configuration example of the terminal apparatus 200 according to this embodiment will be described.

4-3. Configuration Example of Terminal Apparatus

The terminal apparatus 200 has a configuration similar to that of the first embodiment. Note that the control unit 240 according to this embodiment determines an precoding matrix indicator (PMI) using a measurement reference signal before application of a candidate set for a weight set, and feeds the PMI back to the base station 100. A characteristic configuration of this embodiment will now be described.

(Wireless Communication Unit 220)

The wireless communication unit 220 according to this embodiment receives a measurement reference signal to which a candidate set for a weight set has been applied, and in addition, a measurement reference signal to which a candidate set for a weight set has not been applied. Also, the wireless communication unit 220 receives weight set information.

(Storage Unit 230)

The storage unit 230 according to this embodiment stores weight set information received from the wireless communication unit 220. Also, the storage unit 230 according to this embodiment stores the universal set of weight sets. As a result, even when the contents of the weight set information are indexes indicating weight sets, a terminal apparatus 200 can know and acquire the weight sets indicated by the indexes.

(Measurement Unit 243)

The measurement unit 243 measures a measurement reference signal before application of a candidate set for a weight set.

The measurement unit 243 acquires a channel for a measurement reference signal before application of a candidate set for a weight set. Specifically, the measurement unit 243 measures a measurement reference signal to which a candidate set for a weight set has not been applied and which has been received from the wireless communication unit 220, to acquire a spatial channel H. Thereafter, the measurement unit 243 multiplies the spatial channel H by each weight set which is particularly used by the base station 100, according to weight set information received from the base station 100, and evaluates each weight set. For example, in the example shown in FIG. 17, the measurement unit 243 multiplies the spatial channel H by each element of the candidate set $V_A$ for a weight set of the base station 100A, to calculate HV(2), HV(3), and HV(6). These are channels which are acquired by the measurement unit 243 when beamforming has been performed using the weight set V(2), V(3), or V(6) in a transmitter. Thereafter, the measurement unit 243 evaluates each of the calculated channels HV(2), HV(3), and HV(6). For example, the measurement unit 243 determines a weight set which provides highest received power.

(Signal Processing Unit 245)

The signal processing unit 245 determines and feeds a PMI back to the base station 100. Specifically, the signal processing unit 245 determines a PMI on the basis of the result of evaluation of a weight set by the measurement unit 243. For example, the signal processing unit 245 determines a PMI so that a weight set which provides highest received power is used. As a result, the base station 100, when transmitting user data to a terminal apparatus 200, multiplies a weight set which provides highest received power in the terminal apparatus 200.

Thus, the terminal apparatus 200 according to this embodiment can use a closed-feedback code book-based technique using a measurement reference signal to which a candidate set for a weight set is not to be applied, and weight set information.

In the foregoing, a configuration example of the terminal apparatus 200 according to this embodiment has been described. Next, an operation process of the communication system 1 according to this embodiment will be described with reference to FIG. 18.

4-4. Operation Process

Figure 18:
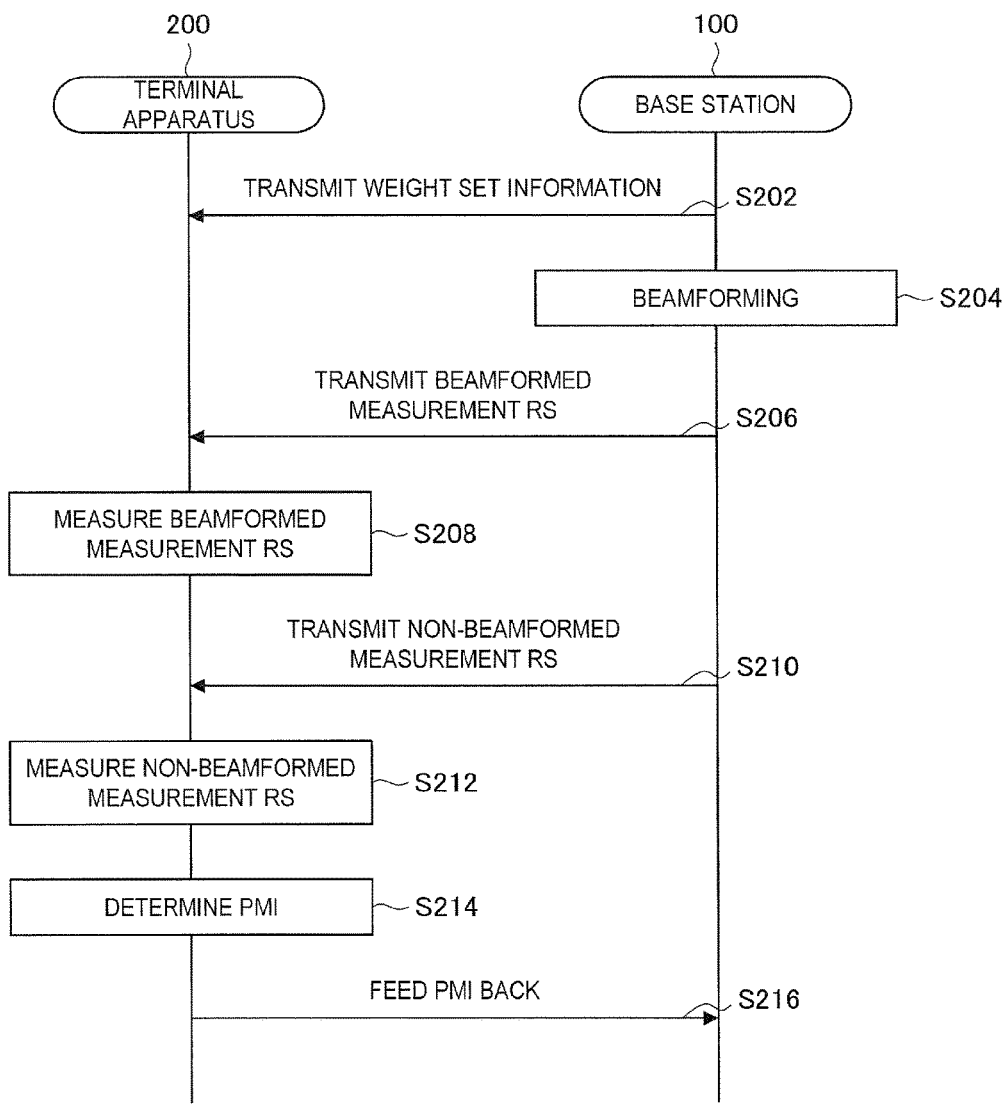
FIG. 18 is a sequence diagram showing an example of a measurement process performed in a communication system according to the second embodiment.

FIG. 18 is a sequence diagram showing an example of a measurement process performed in the communication system 1 according to this embodiment. The base station 100 and the terminal apparatus 200 are involved with the sequence shown in FIG. 18.

As shown in FIG. 18, initially, in step S202, the base station 100 transmits weight set information to the terminal apparatus 200. For example, the base station 100 transmits system information containing weight set information to the terminal apparatus 200.

Next, in step S204, the base station 100 performs beamforming. Next, in step S206, the base station 100 transmits a beamformed measurement reference signal to the terminal apparatus 200. Next, in step S208, the terminal apparatus 200 measures the beamformed measurement reference signal. These processes are similar to steps S102 to S106 described above with reference to FIG. 16, and will not be here described.

Next, in step S210, the base station 100 transmits a non-beamformed measurement reference signal to the terminal apparatus 200. Specifically, initially, the modulation process unit 145 maps the measurement reference signal to a resource element which is different from one for CRS transmission. This measurement reference signal is output to the wireless communication unit 120 without being multiplied by a weight set by the multiplication unit 147. Thereafter, the wireless communication unit 120 transmits the measurement reference signal which has not been multiplied by a weight set through the antenna unit 110. The transmitted measurement reference signal which has not been multiplied by a weight set does not have directivity.

Next, in step S212, the terminal apparatus 200 measures the non-beamformed measurement reference signal. Specifically, the measurement unit 243 measures a spatial channel H for the reference signal received by the wireless communication unit 220.

Thereafter, in step S214, the terminal apparatus 200 determines a PMI. Specifically, the measurement unit 243 multiplies the spatial channel H by each weight set which is particularly used by the base station 100, on the basis of the weight set information received in step S202, and evaluates each weight set. For example, the signal processing unit 245 determines a PMI so that a weight set which provides highest received power is used, on the basis of the result of the evaluation by the measurement unit 243.

Next, in step S216, the terminal apparatus 200 feeds the PMI determined in step S214 back to the base station 100.

Note that the measurement reference signal transmitted in the step S206 and the measurement reference signal transmitted in step S210 may be transmitted using the same resource block.

4-5. Variations

In this embodiment, in order to allow a terminal apparatus 200 to receive a spatial channel H, a measurement reference signal to which a candidate set for a weight set is not to be applied is received. However, in a terminal apparatus (legacy apparatus) to which the technique of this embodiment is not applied, it is difficult to acquire a spatial channel H on the basis of this reference signal. Therefore, the control unit 140 of the base station 100 may limit the operation of a terminal apparatus 200 in an operation mode involving PMI feedback. For example, the control unit 140 of the base station 100 may transmit a control message to a terminal apparatus 200 so that Transmission Modes 4, 5, and 6, defined in the 3GPP, are not used.

5. THIRD EMBODIMENT

5-1. Configuration Example of Base Station

A base station 100 has a configuration similar to that of the first embodiment. Note that the control unit 140 according to this embodiment does not multiply a measurement reference signal by any weight set. Also, the control unit 140 according to this embodiment controls the wireless communication unit 120 so that the wireless communication unit 120 transmits information indicating a plurality of transmission weights for beamforming which are applicable to transmission of user data (i.e., weight set information) to a terminal apparatus 200. A characteristic configuration of this embodiment will now be described.

(Signal Processing Unit 143)

The signal processing unit 143 outputs weight set information indicating a candidate set for a weight set for the base station 100, as transmission data, to the modulation process unit 145 according to an instruction from an upper layer. The weight set information may contain, for example, weight sets themselves contained in a candidate set, or indexes indicating the weight sets. As a result, the terminal apparatus 200 can know and acquire a weight set which is particularly used by the base station 100.

Note that the base station 100 may transmit system information containing the weight set information to a terminal apparatus 200. When system information contains the weight set information, the terminal apparatus 200 can receive the weight set information even when the terminal apparatus 200 is either RRC connected or RRC idle.

Here, an example is assumed in which the base station 100 notifies of the weight set information using RRC signaling. However, in this case, it is difficult for a terminal apparatus 200 which is RRC idle to acquire the weight set information. Therefore, it is desirable that the base station 100 should notify of the weight set information using system information.

As another example, the signal processing unit 143 may output information indicating the sum of all elements in a candidate set for a weight set, as weight set information, to the modulation process unit 145. In this case, for example, the load of a process performed by a terminal apparatus 200 is reduced.

(Modulation Processing Unit 145)

The modulation process unit 145 maps a measurement reference signal to which a candidate set for a weight set is not to be applied, to a wireless resource. For example, the modulation process unit 145 maps a measurement reference signal to which a candidate set for a weight set is not to be applied, to a CRS transmission resource element. A mapping example of a measurement reference signal to which a candidate set for a weight set is not to be applied, in the example shown in FIG. 10, will now be described with reference to FIG. 19.

FIG. 19 is a diagram for describing an example of mapping of a measurement reference signal according to this embodiment. As shown in FIG. 19, a measurement reference signal to which a candidate set for a weight set is not to be applied, is mapped to a CRS transmission resource element.

Next, an example of mapping of a measurement reference signal to which a candidate set for a weight set is not to be applied, in the example shown in FIG. 12, will be described.

FIG. 20 is a diagram for describing an example of mapping of a measurement reference signal according to this embodiment. As shown in FIG. 20, a measurement reference signal to which a candidate set for a weight set is not to be applied, is mapped to a CRS transmission resource element.

FIG. 19 and FIG. 20 are compared with FIG. 11, FIG. 13, and FIG. 17. In this embodiment, there are smaller changes in format than in the other embodiments.

(Multiplication Unit 147)

The multiplication unit 147 does not multiply a measurement reference signal by a weight set. Also, the multiplication unit 147 multiplies a signal containing user data by a weight set suitable for each terminal apparatus 200. A process performed by the multiplication unit 147 will now be described with reference back to FIG. 19 and FIG. 20.

As shown in FIG. 19, the multiplication unit 147 does not apply any weight set to a measurement reference signal which has been mapped to a CRS transmission resource element. As a result, the base station 100A can transmit a non-directional measurement reference signal. Also, the multiplication unit 147 applies the weight set V(2) to a resource element to which a UE specific reference signal has been mapped.

As shown in FIG. 20, the multiplication unit 147 does not apply any weight set to a measurement reference signal which has been mapped to a CRS transmission resource element. As a result, a base station 100B can transmit a non-directional measurement reference signal. Similarly, the multiplication unit 147 does not apply any weight set to all resource elements to which a measurement reference signal has been mapped, in the same resource block. Also, as shown in FIG. 20, the multiplication unit 147 applies the weight set V(1) to a resource element to which a UE specific reference signal has been mapped.

In the foregoing, a configuration example of the base station 100 according to this embodiment has been described. Next, a configuration example of the terminal apparatus 200 according to this embodiment will be described.

5-2. Configuration Example of Terminal Apparatus

The terminal apparatus 200 has a configuration similar to that of the first embodiment. Note that the control unit 240 according to this embodiment receives a measurement reference signal to which a candidate set for a weight set has not been applied, and calculates measurements which are performed when a measurement reference signal to which a candidate set for a weight set has been applied is received. A specific configuration of this embodiment will now be described.

(Wireless Communication Unit 220)

The wireless communication unit 220 according to this embodiment receives a measurement reference signal to which a candidate set for a weight set has not been applied.

Also, the wireless communication unit 220 receives weight set information. The wireless communication unit 220 receives, for example, system information containing weight set information. The weight set information may contain, for example, weight sets themselves contained in a candidate set, or indexes indicating the weight sets. Alternatively, the weight set information may be information indicating the sum of all elements in a candidate set for a weight set. In this case, in the measurement unit 243, the process of adding up all elements in a candidate set for a weight set as described below is removed, and therefore, the process load is reduced.

(Storage Unit 230)

The storage unit 230 according to this embodiment stores weight set information received from the wireless communication unit 220. Also, the storage unit 230 according to this embodiment stores the universal set of weight sets. As a result, even when the contents of the weight set information are indexes indicating weight sets, a terminal apparatus 200 can know and acquire the weight sets indicated by the indexes.

(Measurement Unit 243)

The measurement unit 243 performs measurements when a measurement reference signal after application of a candidate set for a weight set is received by the wireless communication unit 220. More specifically, the measurement unit 243 performs the above measurements by applying a candidate set for a weight set to a measurement reference signal to which a candidate set for a weight set has not been applied and which has been received by the wireless communication unit 220, on the basis of weight set information. Note that the first and second embodiments are different from this embodiment in whether a plurality of transmission weights for beamforming are applied in the transmitter (the base station 100) or the receiver (the terminal apparatus 200). However, these embodiments provide equivalent measurements results.

Initially, the measurement unit 243 measures a measurement reference signal to which a candidate set for a weight set has not been applied and which has been received from the wireless communication unit 220, to acquire a spatial channel H. Thereafter, the measurement unit 243 multiplies the spatial channel H by the sum of all elements in a candidate set, on the basis of weight set information received from the base station 100. As a result, the measurement unit 243 calculates received power which occurs when a measurement reference signal to which a candidate set for a weight set has been applied is received by the wireless communication unit 220. For example, in the example shown in FIG. 10, the measurement unit 243 calculates the received power by the following formula.

[Math. 8]

$$RSRP=H(V(2)+V(3)+V(6)) \qquad \text{Formula (8)}$$

Here, H is a spatial channel acquired by the measurement unit 243. Also, V(2), V(3), and V(6) are a weight set which is particularly used by the base station 100A shown in FIG. 10. The terminal apparatus 200 knows and acquires these weight sets by receiving weight set information.

The measurement unit 243 calculates, on the basis of the received power thus calculated, reception quality which occurs when the measurement reference signal to which a candidate set for a weight set has been applied is received by the wireless communication unit 220. The reception quality is, for example, RSRQ. RSRQ measured by the measurement unit 243 is represented by, for example, formula (7). Here, in this embodiment, the measurement unit 243 measures RSSI in a manner similar to that of the first embodiment. Therefore, also in this embodiment, RSRQ calculated using formula (7) reflects the feature of a cell to be measured, and also reflects the influence of beamforming in an adjacent cell.

Note that, in this embodiment, the terminal apparatus 200 can acquire a spatial channel H itself, and therefore, can use Transmission Modes 4, 5, 6, and the like, which require a spatial channel H itself. Also, in this embodiment, unlike the second embodiment, a new reference signal for acquiring a spatial channel H is not introduced. Also, in this embodiment, beamforming is not performed on a measurement reference signal, and therefore, the inter-cell interference of the measurement reference signal can be reduced.

In the foregoing, a configuration example of the terminal apparatus 200 according to this embodiment has been described. Next, an operation process of the communication system 1 according to this embodiment will be described with reference to FIG. 21.

5-3. Operation Process

Figure 21:
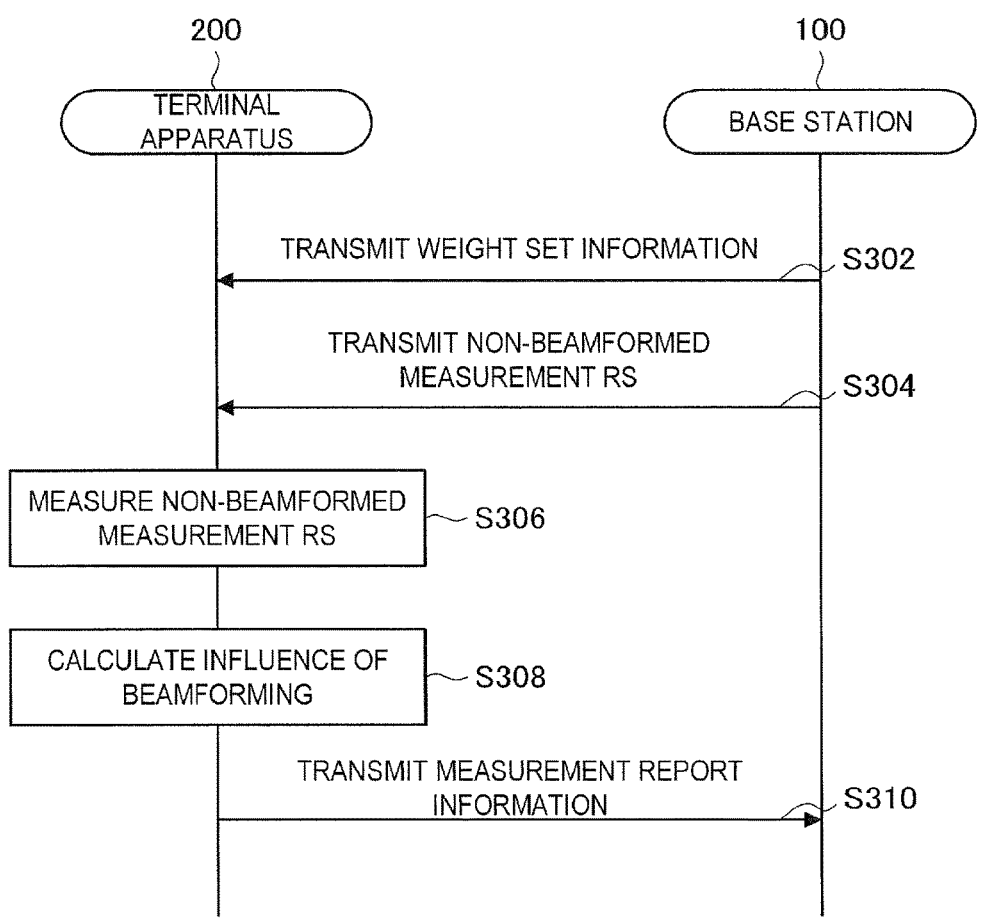
FIG. 21 is a sequence diagram showing an example of a measurement process performed in a communication system according to the third embodiment.

FIG. 21 is a sequence diagram showing an example of a measurement process performed in the communication system 1 according to this embodiment. The base station 100 and the terminal apparatus 200 are involved with the sequence shown in FIG. 21.

As shown in FIG. 21, initially, in step S302, the base station 100 transmits weight set information to the terminal apparatus 200. For example, the base station 100 transmits system information containing weight set information to the terminal apparatus 200.

Next, in step S304, the base station 100 transmits a non-beamformed measurement reference signal to the terminal apparatus 200. Specifically, initially, the modulation process unit 145 maps a measurement reference signal to a CRS transmission resource element. This measurement reference signal is output to the wireless communication unit 120 without being multiplied by a weight set by the multiplication unit 147. Thereafter, the wireless communication unit 120 transmits the measurement reference signal not multiplied by a weight set through the antenna unit 110. The transmitted measurement reference signal has not been multiplied by a weight set, and therefore, does not have directivity.

Next, in step S306, the terminal apparatus 200 measures the non-beamformed measurement reference signal. Specifically, the measurement unit 243 measures a spatial channel H for the reference signal received by the wireless communication unit 220.

Thereafter, in step S308, the terminal apparatus 200 calculates the influence of beamforming. Specifically, initially, the measurement unit 243 adds up weight sets which are particularly used by the base station 100, on the basis of the weight set information received in step S302. Thereafter, the measurement unit 243 multiplies the spatial channel H measured in step S306 by the sum of the weight sets, to calculate received power. For example, in the example shown in FIG. 10, the measurement unit 243 calculates received power using formula (6). Also, the measurement unit 243 measures RSSI, and calculates RSRQ using formula (7).

Thereafter, in step S310, the terminal apparatus 200, when it is RRC connected, performs measurement reporting to the base station 100 by providing measurement report information to the base station 100. Specifically, the control unit 240 transmits, to the base station 100, measurement report information containing RSRP and/or RSRQ measured by the measurement unit 243 in step S308.
(Supplements)

According to a technique described below, measurements affected by the influence of beamforming in an adjacent cell can be performed in a form different from RSRQ shown in formula (7).

For example, the measurement unit 243 applies a candidate set for a weight set to a reference signal from a base station 100 which is not to be measured, to which a candidate set for a weight set has not been applied and which has been received by the wireless communication unit 220, in a manner similar to that described above. As a result, the measurement unit 243 calculates received power which occurs when a measurement reference signal to which a candidate set for a weight set in the base station 100 as a transmission source has been applied and which has been transmitted from each base station 100 which is not to be measured, is received by the wireless communication unit 220.

Note that a candidate set for a weight set which is applied to a reference signal which is not to be measured, is a set of weight sets which are particularly used in a cell as a transmission source, and is sent using, for example, system information. The base station 100 may previously collect, for example, weight set information of an adjacent cell through a backhaul link, and transmit system information containing the weight set information to the terminal apparatus 200.

The measurement unit 243 of the terminal apparatus 200 calculates the reception quality of a reference signal to be measured, using the received power of the reference signal to be measured, and the received power of a reference signal not to be measured. When the received power of the reference signal to be measured is RSRP, and the received power of a reference signal not to be measured is RSRP', the reception quality RSRQ is represented by the following formula.

[Math. 9]

$$RSRQ = \frac{RSRP}{RSRP + \sum RSRP'} \qquad \text{Formula (9)}$$

The above RSRQ is affected by the influence of a beamformed interference signal from a cell not to be measured. Thus, also, by using this technique, measurements reflecting the influence of beamforming in a cell not to be measured can be performed.

6. APPLICATION EXAMPLES

The technique according to the present disclosure is applicable to various products. The base station 100 may also be implemented, for example, as any type of evolved Node B (eNB) such as macro eNBs and small eNBs. Small eNBs may cover smaller cells than the macrocells of pico eNBs, micro eNBs, or home (femt) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station.

The terminal apparatus 200 may be implemented as a mobile terminal such as smartphones, tablet personal computers (PCs), notebook PCs, portable game terminals, portable/dongle mobile routers, and digital cameras, or an in-vehicle terminal such as car navigation apparatuses. The terminal apparatus 200 may be implemented as a machine type communication (MTC) for establishing a machine to machine communication (M2M). Furthermore, the terminal apparatus 200 may be implemented as a wireless communication module (e.g. integrated circuit module constituted with a single die) that is mounted on these terminals.

6.1. Application Examples for Base Station

First Application Example

Figure 22:
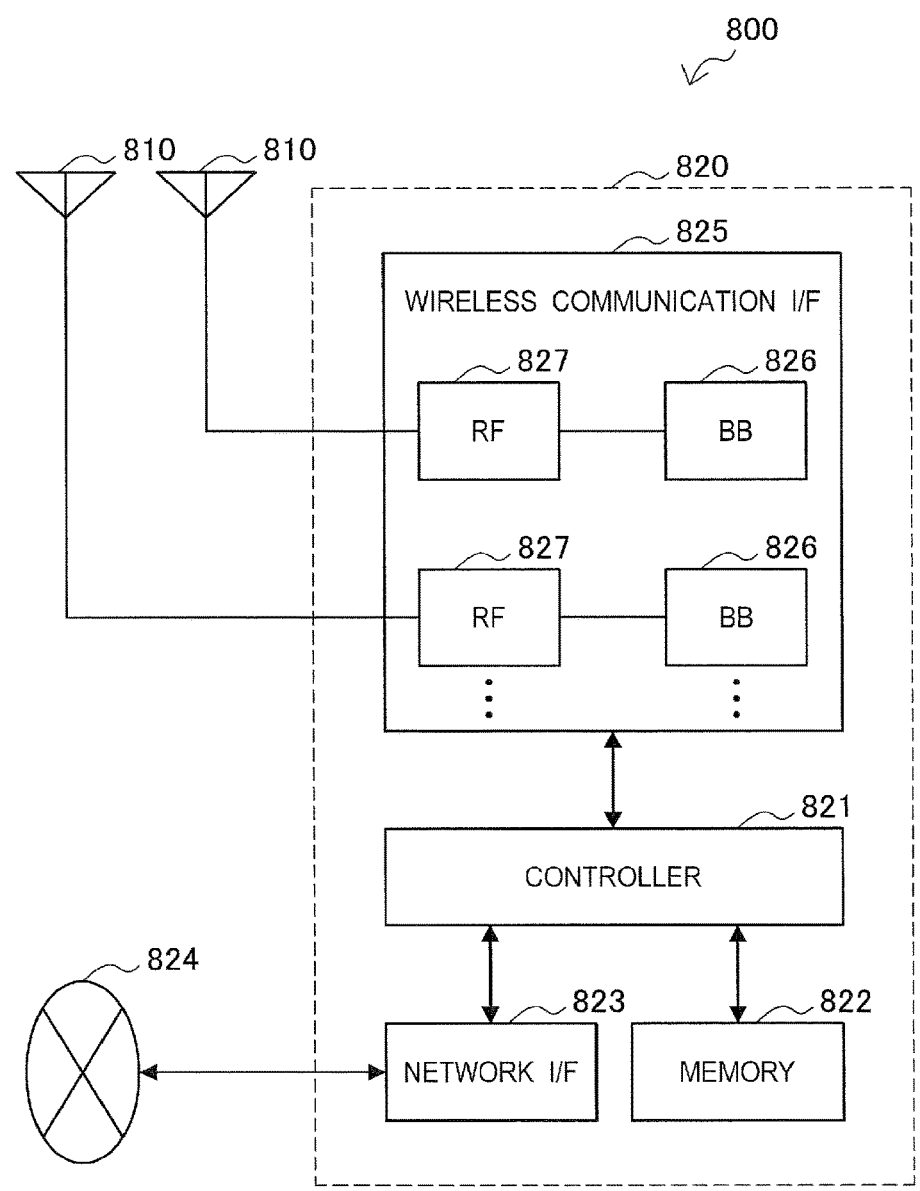
FIG. 22 is a block diagram illustrating a first example of a schematic configuration of an eNB.

FIG. 22 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g. a plurality of antenna elements constituting a MIMO antenna) and is used for the base station apparatus 820 to transmit and receive a wireless signal. The eNB 800 may include the plurality of the antennas 810 as illustrated in FIG. 22, and the plurality of antennas 810 may, for example, correspond to a plurality of frequency bands used by the eNB 800. It should be noted that while FIG. 22 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. The controller 821 may also have a logical function of performing control such as radio resource control, radio bearer control, mobility management, admission control, and scheduling. The control may be performed in cooperation with a surrounding eNB or a core network. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the controller 821 may be mutually connected to the eNB 800 and a core network node or another eNB through a logical interface (e.g. S1 interface or X2 interface). The network interface 823 may be a wired communication interface or a wireless communication interface for wireless backhaul. When the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826 and an RF circuit 827. The BB processor 826 may, for example, perform encoding/decoding, modulation/demodulation, multiplexing/demultiplexing, and the like, and performs a variety of signal processing on each layer (e.g. L1, medium access control (MAC), radio link control (RLC), and packet data convergence protocol (PDCP)). The BB processor 826 may have part or all of the logical functions as discussed above instead of the controller 821. The BB processor 826 may be a module including a memory having a communication control program stored therein, a processor to execute the program, and a related circuit, and the function of the BB processor 826 may be changeable by updating the program. The module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 22, and the plurality of BB processors 826 may, for example, correspond to a plurality of frequency bands used by the eNB 800. The wireless communication interface 825 may also include a plurality of the RF circuits 827, as illustrated in FIG. 22, and the plurality of RF circuits 827 may, for example, correspond to a plurality of antenna elements. FIG. 22 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 22, the wireless communication unit 120, the storage unit 130, and the control unit 140 described above with reference to FIG. 7 may be mounted in the wireless communication interface 825. Alternatively, at least some of the components may be mounted in the controller 821. As an example, the eNB 800 may be equipped with a module including some or all components of the wireless communication interface 825 (for example, the BB processor 826) and/or the controller 821, and the wireless communication unit 120, the storage unit 130, and the control unit 140 may be mounted in the module. In this case, the module may store a program causing the processor to function as the wireless communication unit 120, the storage unit 130, and the control unit 140 (that is, a program causing the processor to perform the operation of the wireless communication unit 120, the storage unit 130, and the control unit 140) and execute the program. As another example, the program causing the processor to function as the wireless communication unit 120, the storage unit 130, and the control unit 140 may be installed in the eNB 800, and the wireless communication interface 825 (for example, the BB processor 826) and/or the controller 821 may execute the program. As described above, the eNB 800, the base station apparatus 820, or the module may be provided as an apparatus including the wireless communication unit 120, the storage unit 130, and the control unit 140, and the program causing the processor to function as the wireless communication unit 120, the storage unit 130, and the control unit 140 may be provided. A readable recording medium in which the program is recorded may be provided.

Second Application Example

Figure 23:
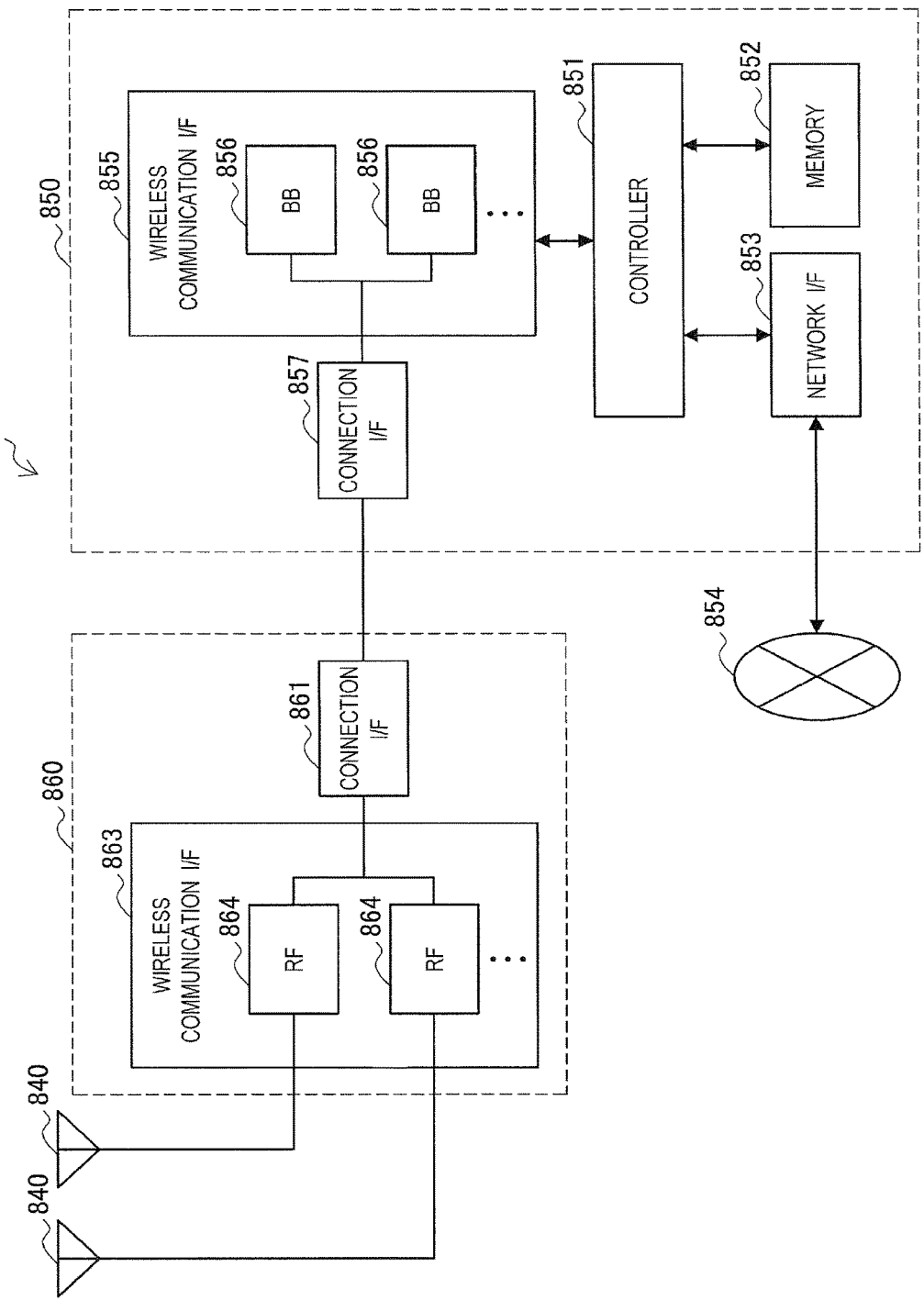
FIG. 23 is a block diagram illustrating a second example of the schematic configuration of the eNB.

FIG. 23 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. The base station apparatus 850 and the RRH 860 may be connected to each other by a high speed line such as optical fiber cables.

Each of the antennas 840 includes a single or a plurality of antenna elements (e.g. antenna elements constituting a MIMO antenna), and is used for the RRH 860 to transmit and receive a wireless signal. The eNB 830 may include a plurality of the antennas 840 as illustrated in FIG. 23, and the plurality of antennas 840 may, for example, correspond to a plurality of frequency bands used by the eNB 830. FIG. 23 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 22.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856. The BB processor 856 is the same as the BB processor 826 described with reference to FIG. 22 except that the BB processor 856 is connected to an RF circuit 864 of the RRH 860 via the connection interface 857. The wireless communication interface 855 may include a plurality of the BB processors 856, as illustrated in FIG. 23, and the plurality of BB processors 856 may, for example, correspond to a plurality of frequency bands used by the eNB 830 respectively. FIG. 23 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the high speed line.

The wireless communication interface 863 transmits and receives a wireless signal via the antenna 840. The wireless communication interface 863 may typically include the RF circuit 864. The RF circuit 864 may include a mixer, a filter, an amplifier and the like, and transmits and receives a wireless signal via the antenna 840. The wireless communication interface 863 may include a plurality of the RF circuits 864 as illustrated in FIG. 23, and the plurality of RF circuits 864 may, for example, correspond to a plurality of antenna elements. FIG. 23 illustrates an example in which the wireless communication interface 863 includes the plurality of RF circuits 864, but the wireless communication interface 863 may include the single RF circuit 864.

In the eNB 830 illustrated in FIG. 23, the wireless communication unit 120, the storage unit 130, and the control unit 140 described above with reference to FIG. 7 may be mounted in the wireless communication interface 855 and/or the wireless communication interface 863. Alternatively, at least some of the components may be mounted in the controller 851. As an example, the eNB 830 may be equipped with a module including some or all components of the wireless communication interface 855 (for example, the BB processor 856) and/or the controller 851, and the wireless communication unit 120, the storage unit 130, and the control unit 140 may be mounted in the module. In this case, the module may store a program causing the processor to function as the wireless communication unit 120, the storage unit 130, and the control unit 140 (that is, a program causing the processor to perform the operation of the wireless communication unit 120, the storage unit 130, and the control unit 140) and execute the program. As another example, the program causing the processor to function as the wireless communication unit 120, the storage unit 130, and the control unit 140 may be installed in the eNB 830, and the wireless communication interface 855 (for example, the BB processor 856) and/or the controller 851 may execute the program. As described above, the eNB 830, the base station apparatus 850, or the module may be provided as an apparatus including the wireless communication unit 120, the storage unit 130, and the control unit 140, and the program causing the processor to function as the wireless communication unit 120, the storage unit 130, and the control unit 140 may be provided. A readable recording medium in which the program is recorded may be provided.

6-2. Application Examples for Terminal Apparatus

First Application Example

Figure 24:
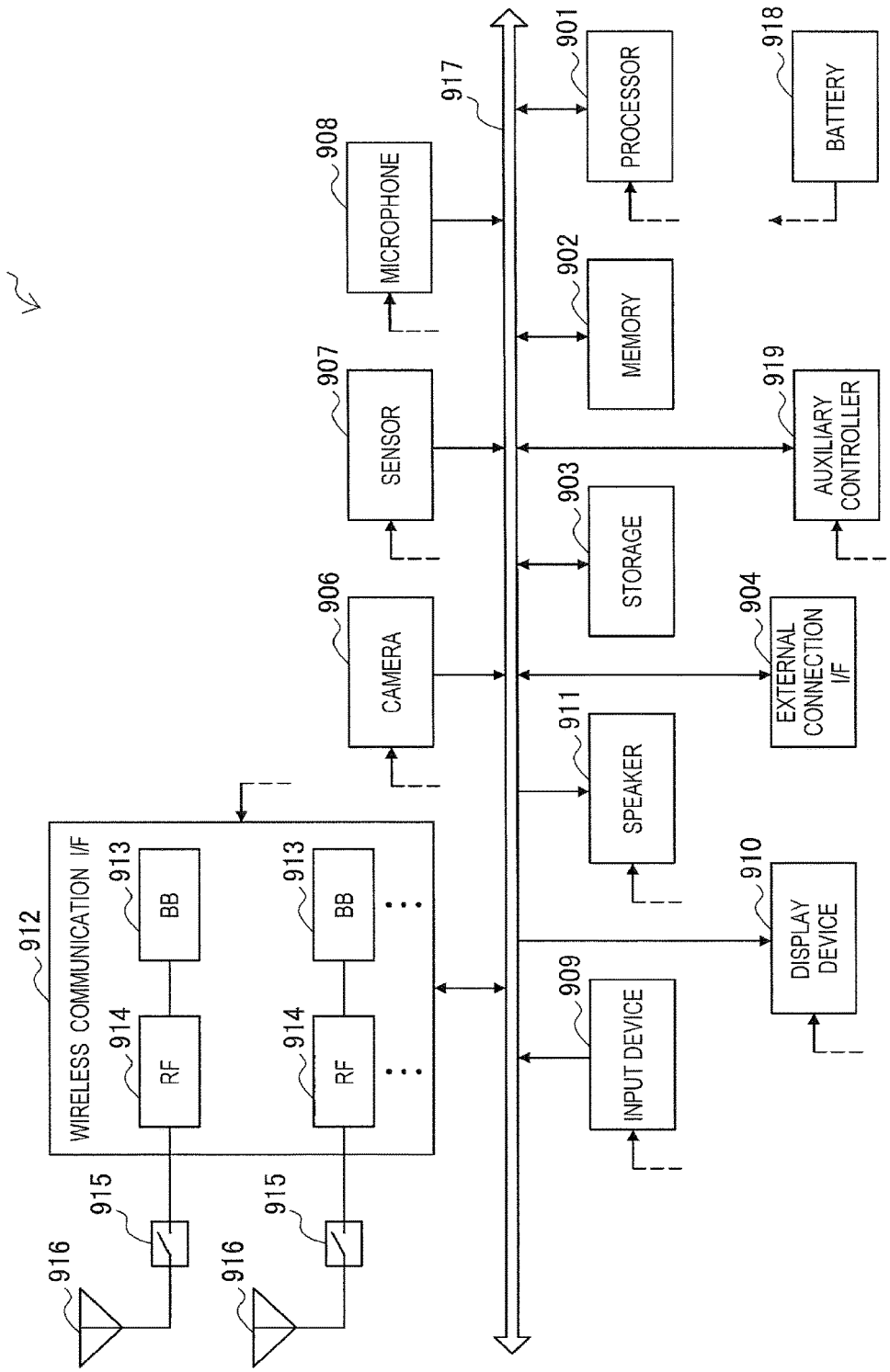
FIG. 24 is a block diagram illustrating an example of a schematic configuration of a smartphone.

FIG. 24 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and a secondary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, and an acceleration sensor. The microphone 908 converts a sound that is input into the smartphone 900 to an audio signal. The input device 909 includes, for example, a touch sensor which detects that a screen of the display device 910 is touched, a key pad, a keyboard, a button, or a switch, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 24. FIG. 24 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 24. FIG. 24 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the secondary controller 919 to each other. The battery 918 supplies electric power to each block of the smartphone 900 illustrated in FIG. 24 via a feeder line that is partially illustrated in the figure as a dashed line. The secondary controller 919, for example, operates a minimally necessary function of the smartphone 900 in a sleep mode.

In the smartphone 900 illustrated in FIG. 24, the wireless communication unit 220, the storage unit 230, and the control unit 240 described above with reference to FIG. 15 may be mounted in the wireless communication interface 912. Alternatively, at least some of the components may be mounted in the processor 901 or the secondary controller 919. As an example, the smartphone 900 may be equipped with a module including some or all components of the wireless communication interface 912 (for example, the BB processor 913), the processor 901, and/or the secondary controller 919, and the wireless communication unit 220, the storage unit 230, and the control unit 240 may be mounted in the module. In this case, the module may store a program causing the processor to function as the wireless communication unit 220, the storage unit 230, and the control unit 240 (that is, a program causing the processor to perform the operation of the wireless communication unit 220, the storage unit 230, and the control unit 240) and execute the program. As another example, the program causing the processor to function as the wireless communication unit 220, the storage unit 230, and the control unit 240 may be installed in the smartphone 900, and the wireless communication interface 912 (for example, the BB processor 913), the processor 901, and/or the secondary controller 919 may execute the program. As described above, the smartphone 900 or the module may be provided as an apparatus including the wireless communication unit 220, the storage unit 230, and the control unit 240, and the program causing the processor to function as the wireless communication unit 220, the storage unit 230, and the control unit 240 may be provided. A readable recording medium in which the program is recorded may be provided.

Second Application Example

Figure 25:
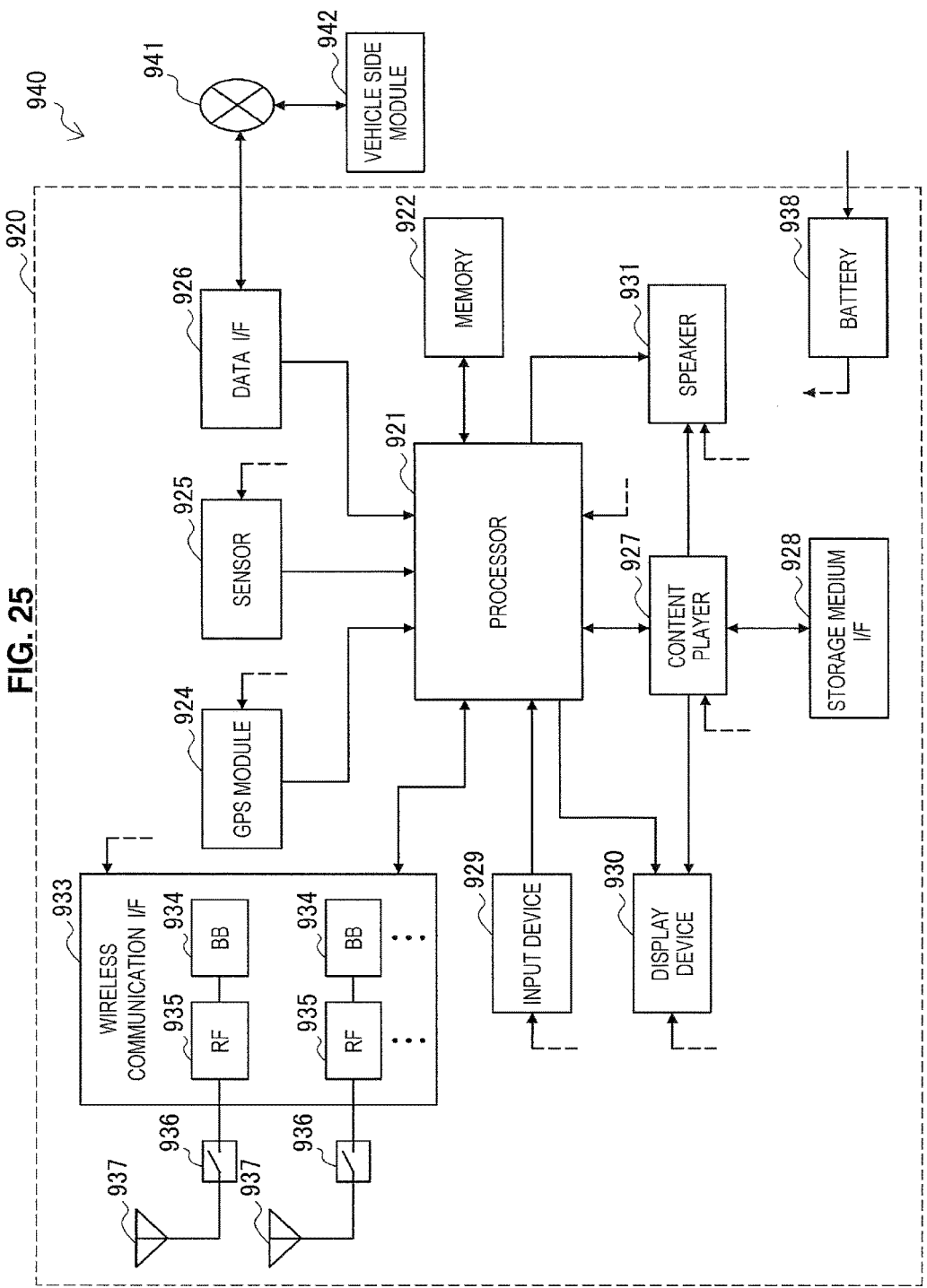
FIG. 25 is a block diagram illustrating an example of a schematic configuration of a car navigation apparatus.

FIG. 25 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g. latitude, longitude, and altitude) of the car navigation apparatus 920. The sensor 925 may include a sensor group including, for example, a gyro sensor, a geomagnetic sensor, and a barometric sensor. The data interface 926 is, for example, connected to an in-vehicle network 941 via a terminal that is not illustrated, and acquires data such as vehicle speed data generated on the vehicle side.

The content player 927 reproduces content stored in a storage medium (e.g. CD or DVD) inserted into the storage medium interface 928. The input device 929 includes, for example, a touch sensor which detects that a screen of the display device 930 is touched, a button, or a switch, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 16. FIG. 16 illustrates an example in which the wireless communication interface 933 includes a plurality of BB processors 934 and a plurality of RF circuits 935, but the wireless communication interface 933 may be a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 includes a plurality of antennas 937 as illustrated in FIG. 25. FIG. 25 illustrates an example in which the car navigation apparatus 920 includes a plurality of antennas 937, but the car navigation apparatus 920 may include a single antenna 937.

Further, the smartphone 920 may include the antenna 937 for each wireless communication system. In this case, the antenna switch 936 may be omitted from a configuration of the car navigation apparatus 920.

The battery 950 supplies electric power to each block of the car navigation apparatus 930 illustrated in FIG. 25 via a feeder line that is partially illustrated in the figure as a dashed line. The battery 950 accumulates the electric power supplied from the vehicle.

In the car navigation apparatus 920 illustrated in FIG. 25, the wireless communication unit 220, the storage unit 230, and the control unit 240 described above with reference to FIG. 15 may be mounted in the wireless communication interface 933. Alternatively, at least some of the components may be mounted in the processor 921. As an example, the car navigation apparatus 920 may be equipped with a module including some or all components of the wireless communication interface 933 (for example, the BB processor 934), and the wireless communication unit 220, the storage unit 230, and the control unit 240 may be mounted in the module. In this case, the module may store a program causing the processor to function as the wireless communication unit 220, the storage unit 230, and the control unit 240 (that is, a program causing the processor to perform the operation of the wireless communication unit 220, the storage unit 230, and the control unit 240) and execute the program. As another example, the program causing the processor to function as the wireless communication unit 220, the storage unit 230, and the control unit 240 may be installed in the car navigation apparatus 920, and the wireless communication interface 933 (for example, the BB processor 934) and/or the processor 921 may execute the program. As described above, the car navigation apparatus 920 or the module may be provided as an apparatus including the wireless communication unit 220, the storage unit 230, and the control unit 240, and the program causing the processor to function as the wireless communication unit 220, the storage unit 230, and the control unit 240 may be provided. A readable recording medium in which the program is recorded may be provided.

Further, the technique according to the present disclosure may be implemented as an in-vehicle system (or a vehicle) 940 including one or more blocks of the above-described car navigation apparatus 920, an in-vehicle network 941 and a vehicle side module 942. The vehicle side module 942 generates vehicle side data such as vehicle speed, engine speed and failure information and outputs the generated data to the in-vehicle network 961.

7. CONCLUSION

In the foregoing, embodiments of the technique according to the present disclosure have been described in detail with reference to FIG. 1 to FIG. 14. According to the above embodiments, in a terminal apparatus 200 which wireless communicates with a base station 100, measurements are performed when a measurement reference signal is received to which the base station 100 has applied a plurality of transmission weights for beamforming and which the base station 100 has transmitted. As a result, in the terminal apparatus 200, measurements affected by beamforming which is particularly used by the base station 100 can be performed. Therefore, for example, when beamforming is performed, a cell suitable for the terminal apparatus 200 can be selected. As a result, the overall throughput of the communication system 1 can be improved.

An example of advantages and disadvantages of each embodiment is shown in a table below. The embodiments share a common feature that a candidate set for a weight set is specified for each cell, and measurements are performed using the candidate set for a weight set and a measurement reference signal.

TABLE 1

| Embodiment | Advantages | Disadvantages |
| --- | --- | --- |
| First | Measurements affected by the influence of beamforming can be performed<br>Measurements affected by the influence of beamforming can also be performed in a legacy apparatus | It is difficult to perform operation to feed PMI back |
| Second | Measurements affected by the influence of beamforming can be performed<br>Measurements affected by the influence of beamforming can also be performed in a legacy apparatus<br>Operation to feed PMI back can be performed | It is difficult for a legacy apparatus to perform operation to feed PMI back |
| Third | Measurements affected by the influence of beamforming can be performed<br>Even in the RRC idle state, measurements affected by the influence of beamforming can be performed | It is difficult for a legacy apparatus to perform measurements affected by the influence of beamforming |

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although an example is described in which the communication system is a system that is compliant with LTE, LTE-Advanced, or a communication scheme that conforms to them, the present disclosure is not limited to such an example. For example, the communication system may be a system that conforms to another communication standard.

Further, it is not always necessary to execute the processing steps in the processing in the present specification in chronological order in order described in the flowcharts or the sequence diagrams. For example, the processing steps in the above-described processing may be executed in order different from the order described in the flowcharts or the sequence diagrams or may be executed in parallel.

Further, it is also possible to create a computer program for making a processor (such as, for example, a CPU and a DSP) provided at apparatuses (such as, for example, the base station, the base station apparatus for the base station or the module for the base station apparatus, or the terminal apparatus or the module for the terminal apparatus) in the present specification function as the components (for example, an information acquiring unit or the communication control unit) of the above-described apparatuses (in other words, a computer program for making the processor execute operation of the components of the above-described apparatuses). Further, it is also possible to provide a recording medium having the above-described computer program recorded therein. Further, it is also possible to provide an apparatus (such as, for example, a finished product and a module (such as parts, processing circuits and chips) for the finished product) including a memory having the above-described computer program stored therein and one or more processors which can execute the above-described computer program. Further, a method including the operation of the components (for example, an information acquiring unit or the communication control unit) of the above-described apparatuses is included in the technique according to the present disclosure.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1)
A terminal apparatus including:
a wireless communication unit configured to perform wireless communication with a base station; and
a control unit configured to perform measurement when the wireless communication unit receives a transmitted measurement reference signal to which the base station has applied a plurality of transmission weights for beamforming.

(2)
The terminal apparatus according to (1),
wherein the plurality of transmission weights for beamforming are beamforming transmission weights which are particularly used by the base station, among a universal set of beamforming transmission weights (3)
The terminal apparatus according to (2), wherein
the wireless communication unit receives the reference signal before application of the plurality of transmission weights for beamforming, the reference signal having been transmitted from the base station, and
the control unit applies the plurality of transmission weights for beamforming to the reference signal before application.

(4)
The terminal apparatus according to (3),
wherein the wireless communication unit receives system information containing information indicating the plurality of transmission weights for beamforming.

(5)
The terminal apparatus according to (3),
wherein the wireless communication unit receives system information containing information indicating a sum of the plurality of transmission weights for beamforming.

(6)
The terminal apparatus according to any one of (3) to (5),
wherein the control unit performs the measurement by calculating the sum of the plurality of transmission weights for beamforming, and multiplying a channel for the reference signal before application by the sum of the plurality of transmission weights for beamforming, and thereby calculating received power which occurs when the reference signal after application of the plurality of transmission weights for beamforming is received by the wireless communication unit.

(7)
The terminal apparatus according to (6),
wherein the control unit performs the measurement by calculating reception quality which occurs when the reference signal after the application is received by the wireless communication unit, on the basis of the calculated received power.

(8)
The terminal apparatus according to (2),
wherein the wireless communication unit receives the reference signal after application of the plurality of transmission weights for beamforming.

(9)
The terminal apparatus according to (8),
wherein the control unit performs the measurement by acquiring a channel for the reference signal after the application, and calculating received power of the reference signal after the application.

(10)
The terminal apparatus according to (9),
wherein the control unit performs the measurement by calculating received power of the reference signal after the application, on the basis of the calculated received power.

(11)
The terminal apparatus according to any one of (8) to (10), wherein
the wireless communication unit receives the reference signal before application of the plurality of transmission weights for beamforming, and
the control unit determines a precoding matrix indicator (PMI) using the reference signal before the application, and feeds the PMI back to the base station.

(12)
The terminal apparatus according to any one of (1) to (11),
wherein the measurement are measurement of reference signal received power (RSRP) or reference signal received quality (RSRQ).

(13)
A base station including:
a wireless communication unit configured to perform wireless communication with a terminal apparatus; and
a control unit configured to control the wireless communication unit in a manner that the wireless communication unit transmits information indicating a plurality of transmission weights for beamforming and a measurement reference signal before application of the plurality of transmission weights for beamforming, to the terminal apparatus.

(14)
The base station according to (13),
wherein the control unit maps the reference signal before the application to a resource element for transmission of a cell-specific reference signal (CRS).

(15)
A base station including:
a wireless communication unit configured to perform wireless communication with a terminal apparatus, and
a control unit configured to control the wireless communication unit in a manner that the wireless communication unit transmits a measurement reference signal after application of a plurality of transmission weights for beamforming.

(16)
The base station according to (15),
wherein the control unit maps the reference signal after the application to a CRS transmission resource element.

(17)
The base station according to (15) or (16),
wherein the control unit controls the wireless communication unit in a manner that the wireless communication unit transmits the reference signal before application of a plurality of transmission weights for beamforming.

(18)
The base station according to (15) or (16),
wherein the control unit limits operation of the terminal apparatus in an operation mode involving PMI feedback.

(19)
A program for causing a computer to function as:
a wireless communication unit configured to perform wireless communication with a terminal apparatus; and
a control unit configured to control the wireless communication unit in a manner that the wireless communication unit transmits information indicating a plurality of transmission weights for beamforming and a measurement reference signal before application of the plurality of transmission weights for beamforming, to the terminal apparatus.

(20)
A program for causing a computer to function as.
a wireless communication unit configured to perform wireless communication with a terminal apparatus; and
a control unit configured to control the wireless communication unit in a manner that the wireless communication unit transmits a measurement reference signal after application of a plurality of transmission weights for beamforming.

(21)
A method including:
performing wireless communication with a base station; and
performing measurement by a processor when the wireless communication unit receives a transmitted measurement reference signal to which the base station has applied a plurality of transmission weights for beamforming.

(22)
A method including:
controlling, by a processor, a wireless communication unit configured to perform wireless communication with a terminal apparatus in a manner that the wireless communication unit transmits information indicating a plurality of transmission weights for beamforming and a measurement reference signal before application of the plurality of transmission weights for beamforming, to the terminal apparatus.

(23)
A method including:
controlling, by a processor, a wireless communication unit configured to perform wireless communication with a terminal apparatus in a manner that the wireless communication unit transmits a measurement reference signal after application of a plurality of transmission weights for beamforming.

REFERENCE SIGNS LIST 1 communication system
100 base station
110 antenna unit
120 wireless communication unit
130 storage unit
140 control unit
141 demodulation process unit
143 signal processing unit
145 modulation process unit
147 multiplication unit
200 terminal apparatus
210 antenna unit
220 wireless communication unit
230 storage unit
240 control unit
241 demodulation process unit
243 measurement unit
245 signal processing unit
247 modulation process unit

The invention claimed is:
1. A terminal apparatus comprising:
a wireless communication transceiver configured to perform wireless communication with a base station; and
controller circuitry configured to receive a transmitted reference signal from the base station and perform measurement of the transmitted reference signal, a plurality of transmission weights being applied by the base station to the transmitted reference signal for beamforming, the plurality of transmission weights stored at the base station, wherein the base station applies the plurality of transmission weights to the transmitted reference signal by multiplying the transmitted reference signal with the plurality of transmission weights,
wherein the controller circuitry performs the measurement by calculating the sum of the plurality of transmission weights for beamforming, and multiplying a channel for the reference signal before application by the sum of the plurality of transmission weights for beamforming, and thereby calculating received power which occurs when the reference signal after application of the plurality of transmission weights for beamforming is received by the wireless communication transceiver,
wherein the terminal apparatus communicates with a base station which has been selected based on the measurement of the transmitted reference signal.

2. The terminal apparatus according to claim 1, wherein the plurality of transmission weights for beamforming are beamforming transmission weights which are particularly used by the base station, among a universal set of beamforming transmission weights.

3. The terminal apparatus according to claim 2,
wherein the wireless communication transceiver receives the reference signal before application of the plurality of transmission weights for beamforming, the reference signal having been transmitted from the base station, and
the controller circuitry applies the plurality of transmission weights for beamforming to the reference signal before application.

4. The terminal apparatus according to claim 3,
wherein the wireless communication transceiver receives system information containing information indicating the plurality of transmission weights for beamforming.

5. The terminal apparatus according to claim 3,
wherein the wireless communication transceiver receives system information containing information indicating a sum of the plurality of transmission weights for beamforming.

6. The terminal apparatus according to claim 1,
wherein the controller circuitry performs the measurement by calculating reception quality which occurs when the reference signal after the application is received by the wireless communication transceiver, on the basis of the calculated received power.

7. The terminal apparatus according to claim 2,
wherein the wireless communication transceiver receives the reference signal after application of the plurality of transmission weights for beamforming.

8. The terminal apparatus according to claim 7,
wherein the controller circuitry performs the measurement by acquiring a channel for the reference signal after the application, and calculating received power of the reference signal after the application.

9. The terminal apparatus according to claim 8,
wherein the controller circuitry performs the measurement by calculating received power of the reference signal after the application, on the basis of the calculated received power.

10. The terminal apparatus according to claim 7,
wherein the wireless communication transceiver receives the reference signal before application of the plurality of transmission weights for beamforming, and
the controller circuitry determines a precoding matrix indicator (PMI) using the reference signal before the application, and feeds the PMI back to the base station.

11. The terminal apparatus according to claim 1,
wherein the measurement includes measurement of reference signal received power (RSRP) or reference signal received quality (RSRQ).

12. A base station comprising:
a wireless communication transceiver configured to perform wireless communication with a terminal apparatus; and
controller circuitry configured to control the wireless communication transceiver in a manner that the wireless communication transceiver transmits information indicating a plurality of transmission weights stored at the base station for beamforming and a measurement reference signal to the terminal apparatus, before application of the plurality of transmission weights by the terminal apparatus, the application of the plurality of transmission weights comprising multiplication of the plurality of transmission weights with the measurement reference signal by the terminal apparatus,
wherein the terminal apparatus performs a measurement of signal strength which has been received by calculating the sum of the plurality of transmission weights for beamforming, and multiplying a channel for the reference signal before application by the sum of the plurality of transmission weights for beamforming, and thereby calculating received power which occurs when the reference signal after application of the plurality of transmission weights for beamforming is received by the terminal apparatus,
wherein the terminal apparatus communicates with a base station which has been selected based on the measurement of the transmitted reference signal.

13. The base station according to claim 12,
wherein the controller circuitry maps the reference signal before the application to a resource element for transmission of a cell-specific reference signal (CRS).

14. A base station comprising:
a wireless communication transceiver configured to perform wireless communication with a terminal apparatus; and
controller circuitry configured to control the wireless communication transceiver in a manner that the wireless communication transceiver transmits a measurement reference signal after application of a plurality of transmission weights stored at the base station, for beamforming, the application of the plurality of transmission weights comprising multiplication of the measurement reference signal with the plurality of transmission weights,
wherein the terminal apparatus performs a measurement of signal strength which has been received by calculating the sum of the plurality of transmission weights for beamforming, and multiplying a channel for the reference signal before application by the sum of the plurality of transmission weights for beamforming, and thereby calculating received power which occurs when the reference signal after application of the plurality of transmission weights for beamforming is received by the terminal apparatus,
wherein the terminal apparatus communicates with a base station which has been selected based on the measurement of the transmitted reference signal.

15. The base station according to claim 14,
wherein the controller circuitry maps the reference signal after the application to a CRS transmission resource element.

16. The base station according to claim 14,
wherein the controller circuitry' controls the wireless communication transceiver in a manner that the wireless communication transceiver transmits the reference signal before application of the plurality of transmission weights for beamforming.

17. The base station according to claim 14,
wherein the controller circuitry limits operation of the terminal apparatus in an operation mode involving PMI feedback.

18. A non-transitory computer-readable storage medium including computer executable instructions, wherein the instructions, when executed, cause a computer at a base station to perform:
wireless communication with a terminal apparatus; and
controlling the wireless communication to transmit information indicating a plurality of transmission weights stored at the base station for beamforming and a measurement reference signal to the terminal apparatus, before application of the plurality of transmission weights by the terminal apparatus, the application of the plurality of transmission weights comprising multiplication of the plurality of transmission weights with the measurement reference signal by the terminal apparatus, wherein the terminal apparatus performs a measurement of signal strength which has been received by calculating the sum of the plurality of transmission weights for beamforming, and multiplying a channel for the reference signal before application by the sum of the plurality of transmission weights for beamforming, and thereby calculating received power which occurs when the reference signal after application of the plurality of transmission weights for beamforming is received by the terminal apparatus, wherein the terminal apparatus communicates with a base station which has been selected based on the measurement of the transmitted reference signal.

19. A non-transitory computer-readable storage medium including computer executable instructions, wherein the instructions, when executed, cause a computer at a base station to perform:

wireless communication with a terminal apparatus; and controlling of the wireless communication to transmit a measurement reference signal after application of a plurality of transmission weights stored at the base station, for beamforming, the application of the plurality of transmission weights comprising multiplication of the measurement reference signal with the plurality of transmission weights, wherein the terminal apparatus performs a measurement of signal strength which has been received by calculating the sum of the plurality of transmission weights for beamforming, and multiplying a channel for the reference signal before application by the sum of the plurality of transmission weights for beamforming, and thereby calculating received power which occurs when the reference signal after application of the plurality of transmission weights for beamforming is received by the terminal apparatus, wherein the terminal apparatus communicates with a base station which has been selected based on the measurement of the transmitted reference signal.

* * * * *